(12) United States Patent
Perna et al.

(10) Patent No.: US 12,104,583 B2
(45) Date of Patent: Oct. 1, 2024

(54) PROPELLANT APPARATUS

(71) Applicant: Accion Systems, Inc., Boston, MA (US)

(72) Inventors: Louis Perna, Boston, MA (US); Bradley Kaanta, Boston, MA (US); Russell Merrick, Boston, MA (US); Adam Zachar, Boston, MA (US); Kellen Blake, Boston, MA (US); William Maulbetsch, Boston, MA (US); Dakota Freeman, Boston, MA (US); Andrew Wollman, Boston, MA (US); Joseph Zimo, Boston, MA (US); Myles Greenough, Boston, MA (US)

(73) Assignee: Accion Systems, Inc., Boston, MA (US)

( * ) Notice: Subject to any disclaimer, the term of this patent is extended or adjusted under 35 U.S.C. 154(b) by 448 days.

(21) Appl. No.: 17/410,157

(22) Filed: Aug. 24, 2021

(65) Prior Publication Data
US 2022/0090587 A1    Mar. 24, 2022

Related U.S. Application Data

(60) Provisional application No. 63/069,631, filed on Aug. 24, 2020.

(51) Int. Cl.
*F03H 1/00* (2006.01)
(52) U.S. Cl.
CPC ................... *F03H 1/0012* (2013.01)
(58) Field of Classification Search
CPC ........................................................ F03H 1/005
See application file for complete search history.

(56) References Cited

U.S. PATENT DOCUMENTS

| 3,486,302 A | 12/1969 | Paynter |
| 4,328,667 A | 5/1982 | Valentian et al. |
| 4,855,604 A | 8/1989 | Riahi |
| 5,018,634 A | 5/1991 | Le |

(Continued)

FOREIGN PATENT DOCUMENTS

| CN | 109751214 A | 5/2019 |
| WO | 02055990 A2 | 7/2002 |

(Continued)

OTHER PUBLICATIONS

Bost, Alexander Connor Larkin, "Materials for Small-Scale Space Propulsion Systems", Submitted to the Department of Aeronautics and Astronautics at the Massachusetts Institute of Technology, Jun. 2017, 92 pages.

(Continued)

*Primary Examiner* — Ehud Gartenberg
*Assistant Examiner* — William L Breazeal
(74) *Attorney, Agent, or Firm* — Jeffrey Schox; Randy Mehlenbacher

(57) ABSTRACT

A system can include a reservoir configured to hold working material, a decontamination module configured to remove contaminants from the working material, a flow control mechanism configured to regulate working material flow between the reservoir and the decontamination module, and a manifold fluidly connecting the reservoir to the decontamination module.

21 Claims, 16 Drawing Sheets

(56) References Cited

U.S. PATENT DOCUMENTS

| | | |
|---|---|---|
| 5,279,323 A | 1/1994 | Grove et al. |
| 5,582,366 A | 12/1996 | Hamant et al. |
| 5,624,875 A | 4/1997 | Nakanishi et al. |
| 6,068,882 A | 5/2000 | Ryu |
| 6,288,390 B1 | 9/2001 | Siuzdak et al. |
| 6,297,499 B1 | 10/2001 | Fenn |
| 6,707,035 B2 | 3/2004 | Hughey et al. |
| 6,768,119 B2 | 7/2004 | De et al. |
| 6,867,415 B2 | 3/2005 | Hughey et al. |
| 7,015,046 B2 | 3/2006 | Wohlstadter et al. |
| 7,097,781 B2 | 8/2006 | Asakawa et al. |
| 7,129,513 B2 | 10/2006 | Zhou et al. |
| 7,199,364 B2 | 4/2007 | Thakur |
| 7,335,897 B2 | 2/2008 | Takats et al. |
| 7,397,032 B2 | 7/2008 | Zona et al. |
| 7,517,479 B2 | 4/2009 | Bango et al. |
| 7,696,489 B2 | 4/2010 | Pilz et al. |
| 7,863,581 B2 | 1/2011 | Lozano et al. |
| 7,932,492 B2 | 4/2011 | Demmons et al. |
| 8,030,621 B2 | 10/2011 | Lozano et al. |
| 8,080,930 B2 | 12/2011 | King |
| 8,084,735 B2 | 12/2011 | Kertesz et al. |
| 8,198,106 B2 | 6/2012 | Akinwande et al. |
| 8,207,496 B2 | 6/2012 | Makarov et al. |
| 8,227,765 B2 | 7/2012 | Syms |
| 8,272,345 B2 | 9/2012 | Robertson et al. |
| 8,324,593 B2 | 12/2012 | Lozano et al. |
| 8,368,295 B2 | 2/2013 | Wei et al. |
| 8,394,877 B2 | 3/2013 | Asakawa et al. |
| 8,722,323 B2 | 5/2014 | Wohlstadter et al. |
| 8,785,881 B2 | 7/2014 | Lozano et al. |
| 8,791,411 B2 | 7/2014 | Lozano et al. |
| 8,850,792 B2 | 10/2014 | Marrese-Reading et al. |
| 9,194,379 B1 | 11/2015 | Biblarz et al. |
| 9,297,368 B1 | 3/2016 | Patterson |
| 9,358,556 B2 | 6/2016 | Velásquez-García et al. |
| 9,362,097 B2 | 6/2016 | Lozano et al. |
| 9,460,884 B2 | 10/2016 | Hopwood et al. |
| 9,478,403 B2 | 10/2016 | Lozano et al. |
| 9,669,416 B2 | 6/2017 | Velásquez-García et al. |
| 9,704,685 B2 | 7/2017 | Lozano et al. |
| 9,895,706 B2 | 2/2018 | Velásquez-García et al. |
| 9,905,392 B2 | 2/2018 | Lozano et al. |
| 10,308,377 B2 | 6/2019 | Lozano et al. |
| 2004/0194305 A1 | 10/2004 | Derochemont et al. |
| 2004/0226279 A1 | 11/2004 | Fenn |
| 2005/0131163 A1 | 6/2005 | Rhine et al. |
| 2005/0133372 A1 | 6/2005 | Zhou et al. |
| 2005/0233085 A1 | 10/2005 | Miller et al. |
| 2005/0257515 A1 | 11/2005 | Song |
| 2005/0269559 A1 | 12/2005 | Zhou et al. |
| 2005/0281379 A1 | 12/2005 | Qiu et al. |
| 2005/0287421 A1 | 12/2005 | Simon et al. |
| 2007/0170056 A1 | 7/2007 | Arnold et al. |
| 2007/0235647 A1 | 10/2007 | Zona et al. |
| 2008/0011617 A1 | 1/2008 | Struthers et al. |
| 2008/0051881 A1 | 2/2008 | Feng et al. |
| 2008/0083335 A1 | 4/2008 | Hruby et al. |
| 2008/0131615 A1 | 6/2008 | Robertson et al. |
| 2008/0307766 A1 | 12/2008 | Petras et al. |
| 2009/0032724 A1 | 2/2009 | Lozano et al. |
| 2009/0072750 A1 | 3/2009 | Akinwande et al. |
| 2009/0113872 A1 | 5/2009 | Demmons et al. |
| 2009/0114838 A1 | 5/2009 | Lozano et al. |
| 2009/0130380 A1 | 5/2009 | Asakawa et al. |
| 2009/0224679 A1 | 9/2009 | Pan et al. |
| 2009/0283824 A1 | 11/2009 | Knight et al. |
| 2009/0309481 A1 | 12/2009 | Chou et al. |
| 2010/0139823 A1 | 6/2010 | Gash et al. |
| 2010/0201251 A1 | 8/2010 | Park et al. |
| 2010/0209788 A1 | 8/2010 | Yoon et al. |
| 2010/0284735 A1 | 11/2010 | Sievers et al. |
| 2010/0289413 A1 | 11/2010 | Eden et al. |
| 2011/0037102 A1 | 2/2011 | Eden et al. |
| 2011/0079138 A1 | 4/2011 | Storrie et al. |
| 2011/0079188 A1 | 4/2011 | Meintschel et al. |
| 2011/0124116 A1 | 5/2011 | Wohlstadter et al. |
| 2011/0126929 A1 | 6/2011 | Velasquez-Garcia et al. |
| 2011/0150765 A1 | 6/2011 | Boyden et al. |
| 2011/0210265 A1 | 9/2011 | Lozano et al. |
| 2011/0214408 A1 | 9/2011 | Yamamoto et al. |
| 2011/0217544 A1 | 9/2011 | Young et al. |
| 2011/0284735 A1 | 11/2011 | Van et al. |
| 2012/0024421 A1 | 2/2012 | Boutet et al. |
| 2012/0037595 A1 | 2/2012 | Asakawa et al. |
| 2012/0045863 A1 | 2/2012 | Hopwood |
| 2012/0104554 A1 | 5/2012 | Eden et al. |
| 2012/0119079 A1 | 5/2012 | Ouyang et al. |
| 2012/0144796 A1 | 6/2012 | Marrese-Reading et al. |
| 2012/0189836 A1 | 7/2012 | Kruglick |
| 2012/0244291 A1 | 9/2012 | Bisht et al. |
| 2012/0280141 A1 | 11/2012 | Kovtoun et al. |
| 2012/0301981 A1 | 11/2012 | Ozgur et al. |
| 2012/0304618 A1 | 12/2012 | Roy |
| 2013/0098774 A1 | 4/2013 | Lozano et al. |
| 2013/0113370 A1 | 5/2013 | Tabib-Azar |
| 2013/0228700 A1 | 9/2013 | Lozano et al. |
| 2013/0241115 A1 | 9/2013 | Core et al. |
| 2013/0256535 A1 | 10/2013 | Meijer et al. |
| 2013/0319599 A1 | 12/2013 | Huang |
| 2014/0054809 A1 | 2/2014 | Lozano et al. |
| 2014/0110661 A1 | 4/2014 | Wang et al. |
| 2014/0284406 A1 | 9/2014 | Brekenfeld et al. |
| 2014/0292180 A1 | 10/2014 | Park et al. |
| 2014/0353397 A1 | 12/2014 | Velasquez-Garcia et al. |
| 2014/0353860 A1 | 12/2014 | Velasquez-Garcia et al. |
| 2015/0060757 A1 | 3/2015 | Lee et al. |
| 2015/0061487 A1 | 3/2015 | Sharifi et al. |
| 2015/0170865 A1 | 6/2015 | Lozano et al. |
| 2015/0255241 A1 | 9/2015 | Bonam |
| 2016/0096185 A1 | 4/2016 | Nobuo et al. |
| 2016/0107178 A1 | 4/2016 | Velásquez-García et al. |
| 2016/0111242 A1 | 4/2016 | Lozano et al. |
| 2016/0168437 A1 | 6/2016 | Demmons et al. |
| 2016/0297549 A1 | 10/2016 | Lozano et al. |
| 2016/0318048 A1 | 11/2016 | Velásquez-García et al. |
| 2016/0376150 A1 | 12/2016 | Lozano et al. |
| 2017/0002978 A1* | 1/2017 | Ballinger ............... F17C 1/14 |
| 2017/0110284 A1 | 4/2017 | Lozano et al. |
| 2017/0369753 A1 | 12/2017 | Demmons et al. |
| 2018/0076003 A1 | 3/2018 | Lozano et al. |
| 2018/0201395 A1 | 7/2018 | Jung-Kubiak et al. |
| 2020/0223564 A1* | 7/2020 | Bock ..................... H01J 27/26 |
| 2020/0378371 A1* | 12/2020 | Lozano ............... B05B 5/1608 |

FOREIGN PATENT DOCUMENTS

| | | |
|---|---|---|
| WO | 2006009854 A2 | 1/2006 |
| WO | 2007002170 A2 | 1/2007 |
| WO | 2009023257 A1 | 2/2009 |
| WO | 2009039338 A1 | 3/2009 |
| WO | 2009137583 A2 | 11/2009 |
| WO | 2010036291 A2 | 4/2010 |
| WO | 2011079138 A2 | 6/2011 |
| WO | 2012078043 A1 | 6/2012 |
| WO | 2013003795 A1 | 1/2013 |
| WO | 2013016497 A2 | 1/2013 |

OTHER PUBLICATIONS

International Preliminary Report on Patentability dated Mar. 3, 2015 for Application No. PCT/US2013/057067.

International Preliminary Report on Patentability dated Nov. 9, 2010 for Application No. PCT/US2009/042990.

International Preliminary Report on Patentability dated Nov. 23, 2015 for Application No. PCT/US2015/021277.

International Preliminary Report on Patentability dated Oct. 9, 2014 for Application No. PCT/US2014/039851.

International Preliminary Report on Patentability dated Sep. 15, 2017 for Application No. PCT/US2015/024827.

International Search Report and Written Opinion dated Nov. 23, 2015 for PCT/US2015/021277.

(56) References Cited

OTHER PUBLICATIONS

International Search Report and Written Opinion dated Oct. 9, 2014 for PCT/US2014/039851.
International Search Report and Written Opinion dated Sep. 15, 2015 for Application No. PCT/US2015/024827.
PCT/US2009/042990, Nov. 6, 2010, International Search Report and Written Opinion.
PCT/US2013/057067, Mar. 3, 2015, International Search Report and Written Opinion.
Bennett, Michael, "Spinning a yarn, nano-style—more affordable fibres", Materials World Magazine. The Institute of Materials, Minerals and Mining. Jan. 7, 2013. 2 pages. www.iom3.org/news/spinning-yarn-nano-style-affordable-fibres Last accessed Jun. 5, 2013.
Bruno, Amelia R., et al., "Design and Testing of a Propellant Management System for Bimodal Chemical-Electrospray Propulsion", 2021 IEEE.
Burger, Christian, et al., "Nanofibrous Materials and Their Applications", Annu. Rev. Mater. Res., No. 36 pp. 333-368, 2006.
Carretero, Jorge A., et al., "Numerical Simulation of Taylor Cone-Jets and Colloid Thruster Plumes", 4th International Conference on Spacecraft Proprulsion, Cagliari, Italy. Jun. 2-4, 2004.
Chang, Chieh, et al., "Continuous near-field electrospinning for large area deposition of orderly nanofiber patterns", Appl. Phys. Lett. 93:123111 (2008).
Chato, David J., et al., "Vented Tank Resupply Experiment: Flight Test Results", Journal of Spacecraft and Rockets, vol. 43, No. 5, Sep.-Oct. 2006.
Chiu, Yu-Hui, et al., "Mass Spectrometric Analysis of Colloid Thruster Ion Emission from Selected Propellants", Journal of Propulsion and Power. 2005. 21(3):416-23.
Clampitt,, R., et al., "Intense field-emission ion source of liquid metals", J of Vaccum Science and Technology. 1975. 12 (1):1208.
Cleaver, et al., "A 100-kV ion probe microfabrication system with a tetrode gun", Vacuum Sci and Technol. 1981. 19(4): 1145-8.
Collard, Timothy A., et al., "Pressurized Xenon Propellant Management System for the CubeSat Ambipolar Thruster", Joint Conference of the 30th International Symposium on Space Technology and Science, 34th International Electric Propulsion Conference and the 6th Nano-satelite Symposium, Hyogo-Kobe, Japan, Jul. 4-10, 2015.
De La Mora, Juan Fernandez, et al., "The Current Emitted by Highly Conductive Taylor Cones", J Fluid Mech., vol. 260, pp. 155-184, 1994.
De La Mora, Juan Fernandez, "The Fluid Dynamics of Taylor Cones", Annual Review of Fluid Mechanics, vol. 39: pp. 217-243 (2007).
Deitzel, J.M, et al., "Controlled deposition of electrospun poly(ethylene oxide) fibers", Polymer No. 42 pp. 8163-8170, 2001.
Despois, Jean-François, et al., "Permeability of open-pore microcellular materials", Acta Materialia. Elsevier, Oxford, GB. Mar. 2005. 53(5): 1381-8.
Doshi, Jayesh, et al., "Electrospinning Process and Applications of Electrospun Fibers", J Electrost. No. 35, pp. 151-160, 1995.
Driese, W., "In situ observation of the tip shape of AuGe liquid alloy ion sources using a high voltage transmission electron microscope", J. Vac. Sci. Technol. B. 1996. 14(5):3367-80.
Escher, Conrad, "Vaccuum Ion Emission From Solid Electrolytes: An Alternative Source for Focused Ion Beams", Applied Physics Letters. 2006. 89: 053513-1 and 053513-2.
Gassend, Blaise, "A Microfabricated Planar Electrospray Array Ionic Liquid Ion Source With Integrated Extractor", Journal of Microelectromechanical Systems, vol. 18, No. 3, pp. 679-694, 2009.
Gassend, Blaise, "Precision In-Plane Hand Assembly of Bulk-Microfabricated Components for High-Voltage MEMS Arrays Applications", J of Microelectromechanical Systems, vol. 18, No. 2, pp. 332-326 (2009).

Gibson, Phillip, et al., "Transport properties of porous membranes based on electrospun nanofibers", Colloids and Surfaces A: Physicochemical and Engineering Aspects, No. 187-188, pp. 469-481 (2001).
Guharay, S. K., "Characteristics of focused beam spots using negative ion beams from a compact surface plasma source and merits for new applications", Journal of Vacuum Science and Technology B. 1998. 16(6): 3370-3.
Guzdar, P. N., et al., "Charging of substrates irradiated by particle beams", Applied Physics Letters. 1997. 71(22). 3302-4.
Hardesty, Larry, "Making 'nanospinning' practical", MIT News Office; https://news.mit.edu/2012/making-nanospinning-practical-1120; Nov. 20, 2012.
Hartwig, Jason W., "Propellant Management Devices for Low-Gravity Fluid Management: Past, Present, and Future Applications", Journal of Spacecraft and Rockets, vol. 54, No. 4, Jul.-Aug. 2017.
He, et al., "Magnetic and photomagnetic properties of polycrystalline wide-gap semiconductor Cd1—xMnxTe thin films", Journal of Electronic Materials. Feb. 1997. 26(2):73-7.
Hemberger, Frank, "Thermal transport properties of functionally graded carbon aerogels", Int J Thermophys. 2009;30:1357-71.
Hill, Frances Ann, "High-Throughput Ionic Liquid Ion Sources Using Arrays of Microfabricated Electrospray Emitters With Integrated Extractor Grid and Carbon Nanotube Flow Control Structures", Technical Digest of the 17th International Conference on Solid-State Sensors Actuators, and Microsystems. Barcelona, Spain. Jun. 16-20, 2013.
Hruby, Vlad, et al., "Micro Newton Colloid Thruster System Development", Electric Rocket Propulsion Society, 2001.
Ishino, Chieko, "Wicking within forests of micropillars", EPL (Europhysics Letters) 79(5):56005, Aug. 2007.
Kobayashi, Keita, et al., "Growth of large-diameter (~4 nm) single-wall carbon nanotubes in the nanospace of mesoporous material SBA-15", Carbon, vol. 49, Issue 15, Dec. 2011, pp. 5173-5179.
Krpoun, R., et al., "Tailoring the hydraulic impedance of out-of-plane micromachined electrospray sources with integrated electrodes", Appl. Phys. Lett., vol. 94, 2009.
Larriba, et al., "Monoenergetic Source of Kilodalton Ions from Taylor Cones of Ionic Liquids", Journal of Applied Physics. 2007. 101: 084303-1 to 084303-6.
Larrondo, et al., "Electrostatic fiber spinning from polymer melts &mdash", 1. Experimental-observations on fiber formation and properties, J Polym. Sci. B 1No. 9, pp. 909-920 (1981).
Larsen, Gustavo, et al., "Use of Coaxial Gas Jackets to Stabilize Taylor Cones of Volatile Solutions and to Induce Particle-to-Fiber Transitions", Adv Mater vol. 16, No. 2, 166-169, (2004).
Lee, Seungsin, et al., "Developing Protective Textile Materials as Barriers to Liquid Penetration Using Melt-Electrospinning", Journal of Applied Polymer Science, vol. 102, pp. 3430-3437, (2006).
Legge, Robert, "18.086 Final Project: Finite Element Modelling of Ionic Liquid Flow Through Porous Electrospray Emitters", May 14, 2008.
Legge, Robert S., et al., "Electrospray Propulsion Based on Emitters Microfabricated in Porous Metals", Journal of Propulsion and Power, vol. 27, No. 2, Mar.-Apr. 2011, pp. 485-494.
Legge, Robert S., et al., "Fabrication and Characterization of Porous Metal Emitters for Electrospray Applications", Brown University (Mechanical Engineering): Department of Aeronautics and Astronautics. May 18, 2008. 140 pages.
Legge, Robert, et al., "Fabrication and Characterization of Porous Metal Emitters for Electrospray Thrusters", IEPC-2007-145 Proc. 30th International Electric Proulsion Conference, Florence, Italy, Sep. 17-20, 2007.
Krejci, David, "Micro-machined ionic liquid electrospray thrusters for Cubesat applications", Oct. 8, 2017; Conference Paper, The 35th International Electric Propulsion Conference, Georgia Institute of Technology, USA.
Lozano, Paulo C., "Energy properties of an EMI-Im ionic liquid ion source", J. Phys. D: Appl. Phys. 39 (2006) 126-134, published Dec. 15, 2005.

(56) References Cited

OTHER PUBLICATIONS

Yang, Bao-Jun, et al., "Research Progress in Preparation and Application of Gradient-P0rous Metal", Apr. 2008. Powder Metallurgy Industry. 18(7).

Yarin, A. L., et al., "Upward needleless electrospinning of multiple nanofibers", Upward needleless electrospinning of multiple nanofibers.

Zeng, H., "the Behavior of Cellular Materials Subjected to Impact Loading", AIP Conference Proceedings. AIP USA. Feb. 15, 2008. vol. 18.

Zhou, Weiping, et al., "Gas Flow-Assisted Alignment of Super Long Electrospun Nanofibers", Journal of Nanoscience and Nanotechnology, vol. 7, 2667-2673, 2007.

Zhou, Feng-Lei, et al., "Mass production of nanofibre assemblies by electrostatic spinning", Polym Int, No. 58, pp. 331-342 (2009).

Zong, Xinhua, et al., "Control of structure, morphology and property in electrospun poly(glycolide-co-lactide) non-woven membranes via post-draw treatments", Polymer 44 (2003) 4959-4967.

Li, et al., "Electrospinning of nanofibers: reinventing the wheel", Advanced Materials, vol. 16, pp. 1151-1170, 2004.

Li, Jian, "The Focused-Ion-Beam Microscope—More than a Precision Ion Milling Machine", JOM. 2006. 58 (3): 27-31.

Lin, Yi, et al., "Preparation of poly(ether sulfone) nanofibers by gas-jet/electrospinning", vol. 107, pp. 909-917, 2008.

Lozano, Paulo, "Electrospray emission from nonwetting flat dielectric surfaces", Journal of Colloid and Interface Science. 2004. 276(2): 392-9.

Lozano, Paulo C, et al., "Energy properties of an EMI-Im ionic liquid ion source", J Phys., D: Appl Phys. 2006. 39: 126-34.

Lozano, Paulo, "Experimental Measurements of Colloid Thruster Plumes in the Ion-Droplet Mixed Regime", (AIAA-3814) 38th Joint Propulsion Conference. Indianapolis, Indiana. Jul. 7-10, 2002. 1-6.

Lozano, Paulo, et al., "Ionic liquid ion sources: characterization of externally wetted emitters", J. Colloid Interf. Sci., vol. 282, pp. 415-421, 2005.

Lozano, Paulo, "Ionic liquid ion sources: suppression of electrochemical reactions using voltage alternation", J. Colloid Interf. Sci. 2004. vol. 280, pp. 149-154.

Lozano, Paulo, "On the dynamic response of externally wetted ionic liquid ion sources", J. Phys. D.: Appl Phys. 2005. 38(14). 2371-7.

Lozano, Paulo, et al., "Performance Characteristics of a Linear Ionic Liquid Electrospray Thruster", IEPC-2005-192. 29th International Electric Propulsion Conference. Princeton University (USA). Oct. 21-Nov. 2005.

Lukas, David, et al., "Self-organization of jets in electrospinning from free liquid surface: A generalized approach", Appl. Phys. 103, 084309 (2008).

McEwen, Alan, et al., "Electrochemical Properties of Imidazolium Salt Electrolytes for Electrochemical Capacitor Applications", Journal of The Electrochemical Society, 146 (5) 1687-1695 (1999).

Mitterauer, J., "Liquid Metal Ion Sources as Thrusters for Electric Space Propulsion", Journal de Physique Colloques, 1987, 48 (C6), pp. C6-171-C6-176.

Mühle, R, "A time-of-flight spectrometer for investigations on liquid metal ion sources", J. Phys. D: Appl Physucs, 1999. 32(2): 161-7.

Paruchuri, Srinivas, et al., "Splitting of a Liquid Jet", Phys. Rev. Lett. vol. 98:134502, 2007.

Petrik, Stanislav, et al., "roduction Nozzle-Less Electrospinning Nanofiber Technology. MRS Proceedings", 1240 1240-WW03-07 doi:10.1557/PROC-1240-WWW03-07 (2009). 12 pages.

Podenok, et al., "Electric Field Enhancement Factors Around a Metallic, End-Capped Cylinder", Nano Brief Reports and Reviews (NANO).

Ponce De Leon, et al., "Batch-Microfabricated Arrays of Electrospinning Emitters for High Throughput Generation of Nanofibers", Technical Digest of the 12th International Workshop on Micro and Nanotechnology for Power Generation and Energy Conversion Applications. Atlanta GA, USA. pp. 227-230, Dec. 2-5, 2012.

Prewett, "Focused Ion Beams from Liquid Metal Ion Sources", Research Studies Press. 1991. 19-30, 78-101 and 151-74.

Quéré, David, "Wetting and Roughness", Annu. Rev. Mater. Res. 2008;38:71-99.

Reneker, Darrell H., et al., "Electrospinning jets and polymer nanofibers", Polymer, vol. 49, pp. 2387-2425, 2008.

Romero-Sanz, "Source of heavy molecular ions based on Taylor cones of ionic liquids operating in the pure ion evaporation regime", J. Appl. Phys., vol. 94, pp. 3599-3605, 2003.

Scipioni, "Performance of multicusp plasma ion source for focused ion beam applications", Journal of Vacuum Science and Technology B. 2000. 18(6). 3194-7.

Sefar, "Common Metal Mesh Configurations", Sefar North America 2009.

Seiwert, Jacopo, et al., "Coating of a textured solid", J. Fluid Mech. 669 55 (2011).

Smith, Noel, et al., "High Brightness Inductively Coupled Plasma Source for High Current Focused Ion Beam Applications", Journal of Vacuum Science and Technology B.2006. 24(6): 2902-6.

Srinivasan, Gokul, et al., "Structure and Morphology of Small Diameter Electrospun Aramid Fibers", Polymer International, No. 36, pp. 195-201, 1995.

Srivastava, Yasmin, "Multijet electrospinning of conducting nanofibers from microfluidic manifolds", J Appl. Polymer Sci. vol. 106 pp. 3171-3178, 2007.

Suzuki, et al., "Contrast Differenes Between Scanning ION and Scanning Electron Microscope Images", Journal Vacuum Science and Technology A. 2004. 22(1): 49-52.

Swanson, et al., "Emission Characteristics of Fallium and Bismuth Liquid Metal Ion Sources", J. Vac. Sci. Technol. 1979. 16(6): 1864-9.

Szilagyi, Miklos, "Electron and lon Optics", Plenum Press. 1988. 216-50 and 251-63.

Taylor, et al., "Disintegration of Water Drops in an Electric Field", Proc. R. Soc. London A 280 (1964) 383-397.

Teo, K. B. K., et al., "Uniform patterned growth of carbon nanotubes without surface carbon", Appl. Phys. Lett., vol. 79, pp. 1534-1536 (2001).

Thavasi, V., et al., "Electrospun nanofibers in energy and environmental applications", Energy Environ. Sci., 2008, 1, 205-221.

Theron, S. A., et al., "Multiple jets in electrospinning: experiment and modeling", Polymer 46 2889-2899 (2005).

Timilsina, Navin, "Electrospray Thrusters for Attitude Control of a 1-U CubeSat", University of California, Irvine, Thesis, 2014.

Tomaszewski, Wacław, et al., "Investigation of Electrospinning with the Use of a Multi-jet Electrospinning Head", Fibres Textiles in Eastern Europe, vol. 13, pp. 22-26, 2005.

Tseng, Ampere A., "Recent Developments in Nanofabrication Using Focused lon Beams", Small. 2005. 1 (10):924-39.

Vaseashta, "Controlled formation of multiple Taylor cones in electrospinning process", Applied Physics Letters, vol. 90, No. 9, 093115 (2007).

Velásquez-García, Luis Fernando, "A Micro-Fabricated Linear Array of Electrospray Emitters for Thruster Applications", Journal of Microelectromechanical Systems, vol. 15, No. 5, Oct. 2006, pp. 1260-1271.

Velásquez-García, Luis Fernando, "A Planar Array of Micro-Fabricated Electrospray Emitters for Thruster Applications Luis", J. of Microelectromechanical Systems, vol. 15, No. 5, pp. 1272-1280 (2006).

Velásquez-García, Luis F., "An Application of 3-D MEMS Packaging: Out-of-Plane Quadrupole Mass Filters", Journal of Microelectromechanical Systems, vol. 16, No. 6, pp. 1430-1438 (2008).

Velásquez-García, Luis Fernando, "CNT-Based MEMS/NEMS Gas I onizers for Portable Mass Spectrometry Applications", Journal of Microelectromechanical Systems, vol. 19, No. 3,pp. 484-493 (2010).

Velásquez-García, Luis, "Fabrication of large arrays of high-aspect-ratio single-crystal silicon cols. with isolated vertically aligned multi-walled carbon nanotube tips", Nanotechnology. Oct. 8, 2008; 19(40): 405305(1-6). doi:10.1088/0957 4484/19/40/405305.

Velásquez-García, Luis Fernando, et al., "Precision Hand Assembly of MEMS Subsystems Using DRIE-Patterned Deflection Spring

(56) References Cited

OTHER PUBLICATIONS

Structures: An Example of an Out-of-Plane Substrate Assembly", J of Microelectromechanical Systems, vol. 16, No. 3, pp. 598-612, Jun. 2007.
Velásquez-García, Luis Fernando, "SLA 3-D Printed Arrays of Miniaturized, Internally Fed, Polymer Electrospray Emitters", Journal of Microelectromechanical Systems, vol. 24, No. 6, Dec. 2015; 24(6):2117-2127, doi: 10.1109/JMEMS.2015.2475696.
Xiao, Rong, et al., "Prediction and Optimization of Liquid Propagation in Micropillar Arrays", Langmuir 26 15070-15075 (2010).
Yamashita, Yoshihiro, et al., "Characteristics of Elastomeric Nanofiber Membranes", Journal of Textile Engineering, vol. 53, No. 4, (2007). 10 pages.
Yamashita, Yoshihiro, "Characteristics of Elastomeric Nanofiber Membranes Produced by Electrospinning", Journal of Textile Engineering. Jan. 2007; 53(4):137-42. doi: 10.4188/jte.53.137.
Yang, Ying, et al., "Multiple Jets in Electrospinning", Proceedings of the 8th International conference on properties and applications of dielectric materials, pp. 940-943 (2006).

* cited by examiner

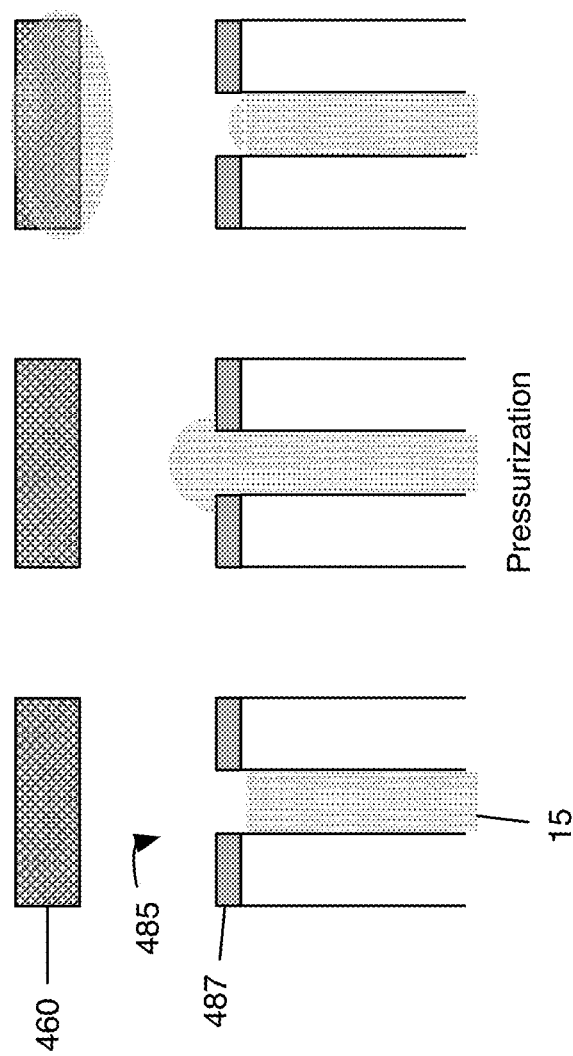

PROPELLANT APPARATUS

CROSS-REFERENCE TO RELATED APPLICATIONS

This application claims the benefit of U.S. Provisional Application No. 63/069,631, filed 24 Aug. 2020, which is incorporated in its entirety by this reference.

STATEMENT OF GOVERNMENT SUPPORT

This invention was made with government support under Award Number 000-15-C-0176 awarded by the Department of Defense and Award Number FA9300-20-C-0009 awarded by the Air Force Research Laboratory. The government has certain rights in the invention.

TECHNICAL FIELD

This invention relates generally to the propellant management field, and more specifically to a new and useful system and method in the propellant management field.

BACKGROUND

Launching spacecraft into space can expose propellant to harsh environments. The challenges associated with exposure to harsh environments can be exacerbated by the presence of contaminants in sensitive systems. Contamination prevention is non-trivial; typically relying on working in sanitized, controlled environments (e.g., clean rooms) during propellant sealing, and taking extensive measures to initially remove contaminants. Despite these considerations, complete removal of contaminants already present in propellants cannot be ensured. Furthermore, propellant will continue to absorb contaminants from their environment during storage on the ground and while in orbit. Thus, there is a need for new and improved apparatus in the propellant management field. This invention provides such a new and improved apparatus.

BRIEF DESCRIPTION OF THE FIGURES

FIG. 17 is a schematic representation of an exemplary voltage isolator.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
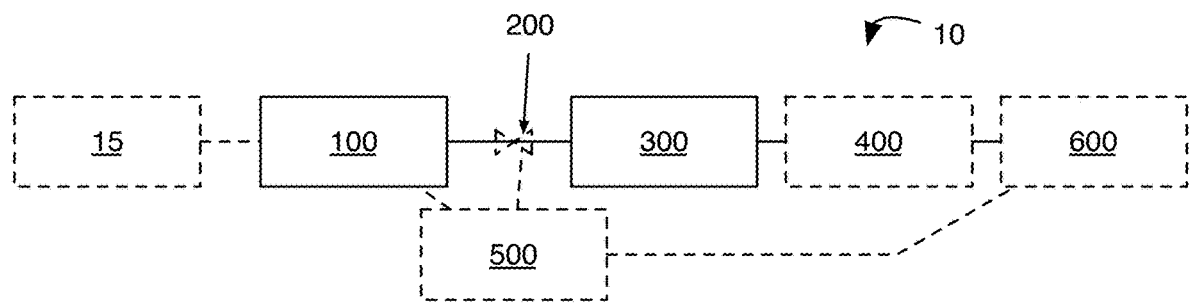
FIG. 1 is a schematic representation of the apparatus.

As shown in FIG. 1, the apparatus 10 can include a reservoir 100 and a decontamination module 300. The apparatus can optionally include a flow management system 200, a propellant management device 400, a control system 500, and/or any suitable components. The apparatus can be connected to an endpoint 600, stand alone, and/or connect or be integrated with any suitable system(s).

The apparatus preferably functions to provide working material 15 (e.g., working fluid, propellant, etc.) to an endpoint without exposing the working material to contaminants (e.g., less than a threshold concentration of contaminants), without generating (e.g., forming) contaminants (e.g., from chemical reactions, from electrochemical reactions, etc.), and/or overpressurizing the apparatus, which can cause undesirable leaks or flooding. The apparatus can also function to actively remove contaminants from the working material. The apparatus is preferably in fluid communication with one or more working materials (e.g., working fluids, propellants, etc.).

The apparatus 10 is preferably used in a microgravity environment (e.g., to dose an electrospray emission device such as a thruster with propellant); however, the apparatus can additionally or alternatively be used in the biomedical field (e.g., to dose a working material in an injection needle), in electrospray devices, and/or any other suitable field. For example, the apparatus can be mounted to and/or included in a spacecraft (e.g., a satellite such as a CubeSat, U-class spacecraft, picosatellite, nanosatellite, microsatellite, minisatellite, ESPA-class spacecraft, geostationary space craft, 100-kg, 500-kg, 1000-kg, 2000-kg, etc.; Space Shuttle; interplanetary probes; extra-solar probes; etc.).

In a specific example, the apparatus can be operable between a sealed mode and an emission mode; however, can include any suitable modes. In the sealed mode, the working material is preferably enclosed (e.g., contained such as within the reservoir), wherein the working material cannot leak out and (additional external) contaminants cannot be introduced to the working material. In the emission mode, the apparatus can allow and/or cause working material to flow out of the reservoir. Any volatile contaminants that are in the working material (e.g., from working material manufacture, working material loading, working material storage, etc.) can be removed from the working material in this mode (e.g., by a decontamination module, in an outgassing chamber, in a degassing chamber, etc.). In the emission mode, the working material can be ejected from the apparatus (e.g., into an electrospray emission device). However, the apparatus can operate in any suitable manner. In a variation of this specific example, the apparatus can be operable in three modes such as a sealed mode, an emission mode, and a decontamination mode. In this variation, the decontamination mode can be a mode where the working material is decontaminated (e.g., by exposing the working material to an external environment proximal the apparatus). The working material can be decontaminated to a target decontamination level (e.g., a target concentration or identity of contaminants, a target pressure, etc.), to an achievable contamination level (e.g., fully decontaminated to the extent possible for a given decontamination method, an equilibrated pressure such as with an external environment, etc.), and/or decontaminated to any suitable target. Decontamination can be contaminant specific (based on specific contaminants, contaminant classes, contaminant phases, contaminant properties, etc.) and/or contaminant nonspecific (e.g., total contaminant concentration, mass, volume etc.). The decontamination mode is preferably performed before the emission mode (e.g., for a predetermined amount of time prior to switching to the emission mode) or at the same time as the emission mode, but can be performed with any suitable timing. The mode of operation can be controlled or determined based on a sensor reading, a flow management system (e.g., operational state of the flow management system), apparatus geometry, apparatus materials, flow path, a timer, and/or otherwise be determined.

2. Benefits

Variations of the technology can confer several benefits and/or advantages.

First, variants of the technology can enable contaminants to be removed from the working material allowing contaminated working material to be used. In a specific example, any contaminant (e.g., water; gases such as $CO_2$, $N_2$, $O_2$, etc.; organic solvents such as alcohols, ethers, etc.; naturally occurring contaminants; artificially introduced contaminants; etc.) that is absorbed by the working material (e.g., during manufacture; during loading; during storage; during testing; during operation, such as during launch preparation, launch, in-space storage, use, etc.; etc.) can be removed during apparatus use (e.g., before working material consumption). In related examples, contaminants can be intentionally introduced (e.g., to be removed) such as to pressurize the apparatus, to enable voltage isolation, and/or can be introduced for any reason.

Second, variants of the technology can receive benefits from active and/or passive fluid control properties. In a specific example, the technology can be resistant to wear (e.g., because of passive components such as a decontamination module, a propellant management device, etc.) and can be readily controlled (e.g., because of active components such as a valve, a pump, a flow management system, sensor(s), etc.). Variations of this example can enable transitions between active and passive working material transport. In a second specific example, an apparatus can leverage a fully passive system for managing working material transport (e.g., in a microgravity environment).

Third, variants of the technology can provide a motive force for spontaneous phase separation in the absence of body forces (e.g., buoyancy). In specific examples, the propellant management device can ensure that the working material leaves the apparatus with a stable (e.g., continuous, steady, controlled, etc.) flow. In specific examples, the apparatus can promote bubble formation (e.g., at various pressures that are typically below the highest pressure of the apparatus or external system, including below absolute vacuum pressure) upstream of the output(s) (e.g., endpoints) of the apparatus.

Fourth, variants of the technology can ensure that the correct amount of working material is expelled (e.g., delivered to the electrospray emission device). Specific examples of the technology can enable this by determining (e.g., precisely such as to the nearest 1 ms, nearest 10 ms, etc.) when the valve is opened and for how long. In this specific example, analytic models based on the hydraulic resistance, temperature, pressure, viscosity, and/or other apparatus and/or working material parameters can be used to determine the amount of working material expelled in the time the valve is open. In related examples, an amount of working material that has been dosed can be sensed, where the amount of dosed working material can be used to determine or control operation of the valve.

Fifth, variants of the technology can be lightweight, compact, and robust to harsh environments. In specific examples, the apparatus can be made of materials (such as polymers) that are light-weight and resistant to the space environment (e.g., high vacuum, extreme temperatures, high radiation, atomic oxygen, atmospheric plasma, microgravity, etc.). In these specific examples, the components of the apparatus can be designed and/or arranged for a compact footprint. For instance, working material can be used to shield other components such as by designing a reservoir such that the working material and reservoir surround the other components.

Sixth, variants of the technology can enable voltage isolation within a conductive fluid (e.g., between branches of conductive fluid such as working material fed from a common reservoir).

However, variants of the technology can confer any other suitable benefits and/or advantages.

3. Apparatus

The apparatus 10 preferably functions to expel (e.g., to dose an electrospray emission device) a working material 15 (e.g., a known amount, a steady amount, a semi-continuous amount, etc.) in a controlled manner (e.g., remove contaminants from the working material, in a steady stream, with stable flow, etc.). The apparatus can also function to keep the working material clean (e.g., prevent contaminants from coming in contact with the working material). However, the apparatus can perform any suitable function. While discussed as separate components, different aspects of the apparatus can be collocated or integrated together, be separate, be fastened together (e.g., in a leak-proof or leak-resistant manner), and/or otherwise be related to one another. Components can be directly contacting (e.g., working material passes from one component directly to another), connected via a manifold (e.g., tubing, a tortuous pathway, capillary, microfluidic path, etc.), and/or otherwise be connected or interfaced.

The working material preferably functions to provide a solution of ions (e.g., cations, anions) that can be used to generate thrust (e.g., at an endpoint such as an electrospray emission device); however, the working material can perform any other suitable function. The working material is preferably stored in the reservoir. The working material preferably has a low vapor pressure (e.g., <10 Pa, <1 Pa, <0.1 Pa, <0.01 Pa, <$10^{-3}$ Pa, <$10^{-4}$ Pa, <$10^{-5}$ Pa, <$10^{-6}$ Pa, $<10^{-7}$ Pa, $<10^{-8}$ Pa, $<10^{-9}$ Pa, $<10^{-10}$ Pa; vapor pressure less than the pressure of the space environment, etc. at a given temperature such as at room temperature, at a temperature between about −250° C. to 300° C., at a temperature between −20° C. to 6° C., at an operation temperature, etc.); however, the working material can have any suitable vapor pressure. The working material is preferably an ionic liquid (e.g., an ionic compound such as an anion bound to a cation that is liquid at temperature T<100° C.). The ionic liquid can be organic or inorganic and can include asymmetric or symmetric bulky organic or inorganic cations and/or bulky organic or inorganic anions, charged polymers, or have any other suitable composition. The ionic liquid can include: a short chain ionic liquid (e.g., ions with short aliphatic side chains such as those containing at most six carbon atoms), a long chain ionic liquid (e.g., ions with long aliphatic side chains such as those containing at least six carbon atoms), a branched chain ionic liquid, a mixture thereof, or be any other suitable ionic liquid. However, additionally or alternatively, the working material can include a monopropellant (e.g., hydroxylammonium nitrate (HAN), ammonium dinitramide (ADN), hydrazinium nitroformate (HNF), ammonium nitrate (AN), hydrazinium nitrate (HN), Advanced Spacecraft Energetic Non-Toxic (ASCENT) propellant, etc. optionally associated with one or more ionic or molecular fuel such as tris(ethano) ammonium nitrate (TEAN), ammonium azide (AA), hydrazinium azide (HA), 2-hydroxyethylhydrazinium nitrate, methanol, ethanol, glycerol, glycine, urea, etc.), a room temperature ionic solid (RTIS), an electrically conductive fluid, a high temperature ionic liquid (e.g., an ionic liquid that is liquid at T>100° C.), and/or any other suitable material. The ionic liquid is preferably imidazolium based (e.g., includes derivatized imidazolium ions such as 1-Ethyl-3-methylimidazolium tetrafluoroborate (EMIM-BF4), 1-ethyl-3-methylimidazolium bis(trifluoromethylsulfonyl)imide (EMIM-Tf2N), 1-ethyl-3-methylimidazolium bis(perfluoroethylsulfonyl)imide (EMIM-Beti), etc.); however, any suitable ionic liquid(s) (or class thereof) can be used.

During operation, the working material is preferably free of contaminants (e.g., essentially composed of working material, less than a threshold concentration of contaminants, working material provided to the outlet or endpoint is free of contaminants, etc.). However, the working material can include contaminants (e.g., intentionally include contaminants). The contaminants are preferably gaseous, but can be liquid, solid, plasma, and/or have any suitable state of matter at standard temperature and pressure. The contaminants can be incidentally introduced (e.g., during loading, storage, operation, etc.), intentionally introduced (e.g., to pressurize a reservoir, to use for voltage isolation, to induce a working material property, etc.), and/or otherwise be introduced into the working material. The contaminants can be dissolved in, mixed with, and/or otherwise be integrated with or separate from the working material. The contaminant concentration (e.g., mass percentage, volume percentage, partial pressure, mole fraction, etc. for incidental, intentional, and/or any other contaminants) is preferably less than about 10% (e.g., 1 ppb, 2 ppb, 5 ppb, 10 ppb, 20 ppb, 50 ppb, 100 ppb, 200 ppb, 500 ppb, 1 ppm, 2 ppm, 5 ppm, 10 ppm, 20 ppm, 500 ppm, 0.1%, 0.2%, 0.5%, 1%, 2%, 5%, values therebetween, <1 ppb, >5%), but can be greater than about 10% and/or any suitable fraction or amount (where fraction or amount can refer to total contaminant fraction and/or contaminant fraction for specific contaminants). The contaminant concentration (e.g., particularly but not exclusively when contaminants are intentionally added) is preferably greater than about 1 ppb (e.g., 1 ppb, 2 ppb, 5 ppb, 10 ppb, 20 ppb, 50 ppb, 100 ppb, 200 ppb, 500 ppb, 1 ppm, 2 ppm, 5 ppm, 10 ppm, 20 ppm, 500 ppm, 0.1%, 0.2%, 0.5%, 1%, 2%, 5%, values therebetween, <1 ppb, >5%), but can be less than 1 ppb and/or any suitable concentration. In an illustrative example, a contaminant concentration can be between about 0.1% and 5% (e.g., by mass, by volume, by purity, etc.). However, any suitable contaminant concentration can be used. Exemplary contaminants can include water, dissolved gases (e.g., $CO_2$, $O_2$, $N_2$, etc.), organic molecules (e.g., organic solvents such as alcohols, ethers, esters, aromatics, etc.), and/or any suitable molecule or element. In some variations, target contaminants (e.g., specific contaminants, contaminant concentrations, contaminant (partial) pressures, contaminant mole fractions) can be added (e.g., dissolved, mixed, etc.) to achieve target working material properties (e.g., viscosity, wetting behavior, bubble nucleation, flow rate, flow turbidity, etc.).

Working material within the apparatus can be actively and/or passively moved (e.g., flow). For example, passive working material flow can be enabled using capillary pressure, working material surface interactions, surface roughness of structures in contact with working material, working material and/or apparatus chemical potential, static pressure differential, and/or in any manner. Active working material flow can be provided, for example, by a pump, induced fluid head pressure (e.g., induced by a centrifugal force such as spin-induced "artificial gravity" where the spin can be created by the apparatus and/or by an external system the apparatus is installed in), or other working material displacement mechanism. The flow can be continuous, intermittent, periodic, all-in-one (e.g., displacing the entire volume in a single emission), and/or can have any suitable properties. The flow rate is preferably a value between a minimum flow rate (e.g., to fill the apparatus with working material faster than the working material is expelled instantaneously, over a long period of intermittent use, etc.) and a maximum flow rate (e.g., to avoid, prevent, minimize, etc. flooding the apparatus; to facilitate control over dosing of working material; etc.). However, the flow rate can be less than the minimum flow rate or greater than the maximum flow rate. The working material flow rate (and/or its minimum or maximum) can depend on the apparatus (e.g., manifold or path diameter, manifold material, etc.), flow restrictors, temperature (e.g., working material temperature, apparatus temperature, etc.), pressure (e.g., a pressure differential), flow mechanism (e.g., active flow, passive flow, etc.), working material, and/or any suitable properties. For example, the flow rate can be any value or range thereof between about 0.1 nL/s and 100 mL/s (e.g., 100 nL/s, 200 nL/s, 500 nL/s, 1 µLs, 2 µL/s, 5 µL/s, 10 µL/s, 20 µL/s, 50 µL/s, 100 µL/s, 200 µL/s, 500 µL/s, 1 mL/s, 2 mL/s, 5 mL/s, 10 mL/s, 20 mL/s, 50 mL/s, 100 mL/s, values therebetween), less than 0.1 nL/s, or greater than 100 mL/s.

The flow path (e.g., defined by a manifold) can be one-dimensional (e.g., a linear path, a tortuous path, an unbranching path, etc.), two-dimensional (e.g., a branching path, fixed to a plane, etc.), three-dimensional, and/or any suitable dimensionality (e.g., fractal geometry).

3.1 Reservoir

The reservoir 100 preferably functions to hold (e.g., store) the working material. The reservoir can additionally or alternatively provide thermal and/or radiation management or protection for other apparatus components (e.g., electronic components such as the control system can be embedded in, surrounded by, enclosed by, etc. the reservoir and working material therein; protection for the working material; etc.). The reservoir is preferably configured (e.g., sealed) to control (e.g., minimize, prevent, mitigate risk of, etc.) loss and/or contamination of working material. The reservoir can store contaminated working material, partially contaminated working material (e.g., working material with predetermined or specific contaminants, working material with at most a threshold contaminant content, etc.), and/or decontaminated working material. However, the reservoir can be unsealed and/or otherwise be configured.

The reservoir is preferably in fluid communication with the decontamination module (e.g., an inlet of the decontamination module, via a flow management system(s) such as when the flow management system is open, working material can flow between the reservoir and the decontamination module, when the flow management system is closed fluid cannot flow between the reservoir and the decontamination module, etc.). However, the reservoir can be in fluid communication with a manifold (e.g., wherein a manifold fluidly connects the decontamination module and the reservoir), with a pumping chamber (e.g., wherein the pump is in a separate chamber and/or compartment), in fluid communication with an endpoint, a combined reservoir-decontamination module, and/or otherwise suitably arranged.

Figure 10:
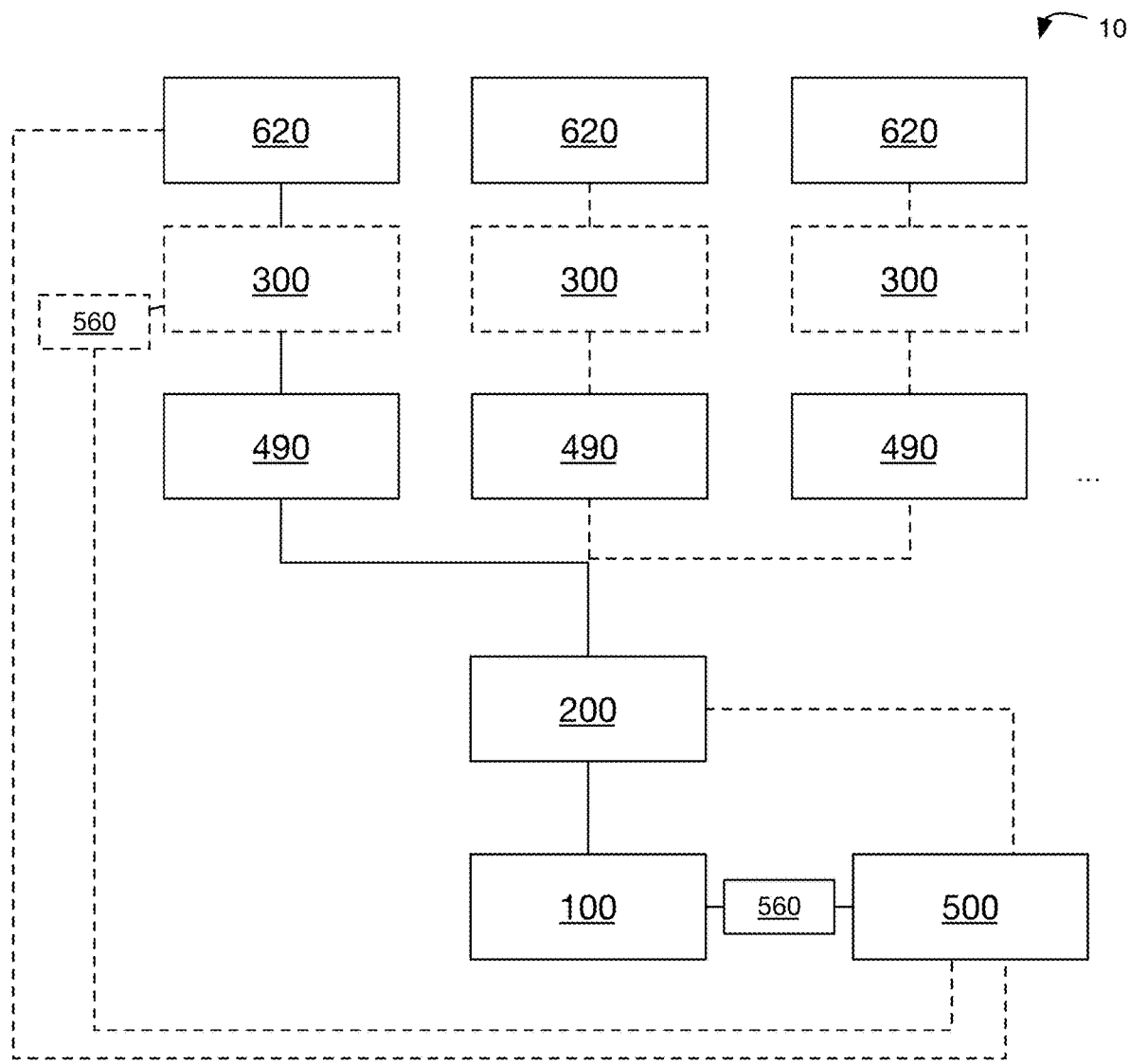
FIG. 10 is a schematic representation of an exemplary embodiment of the system.
Figure 11:
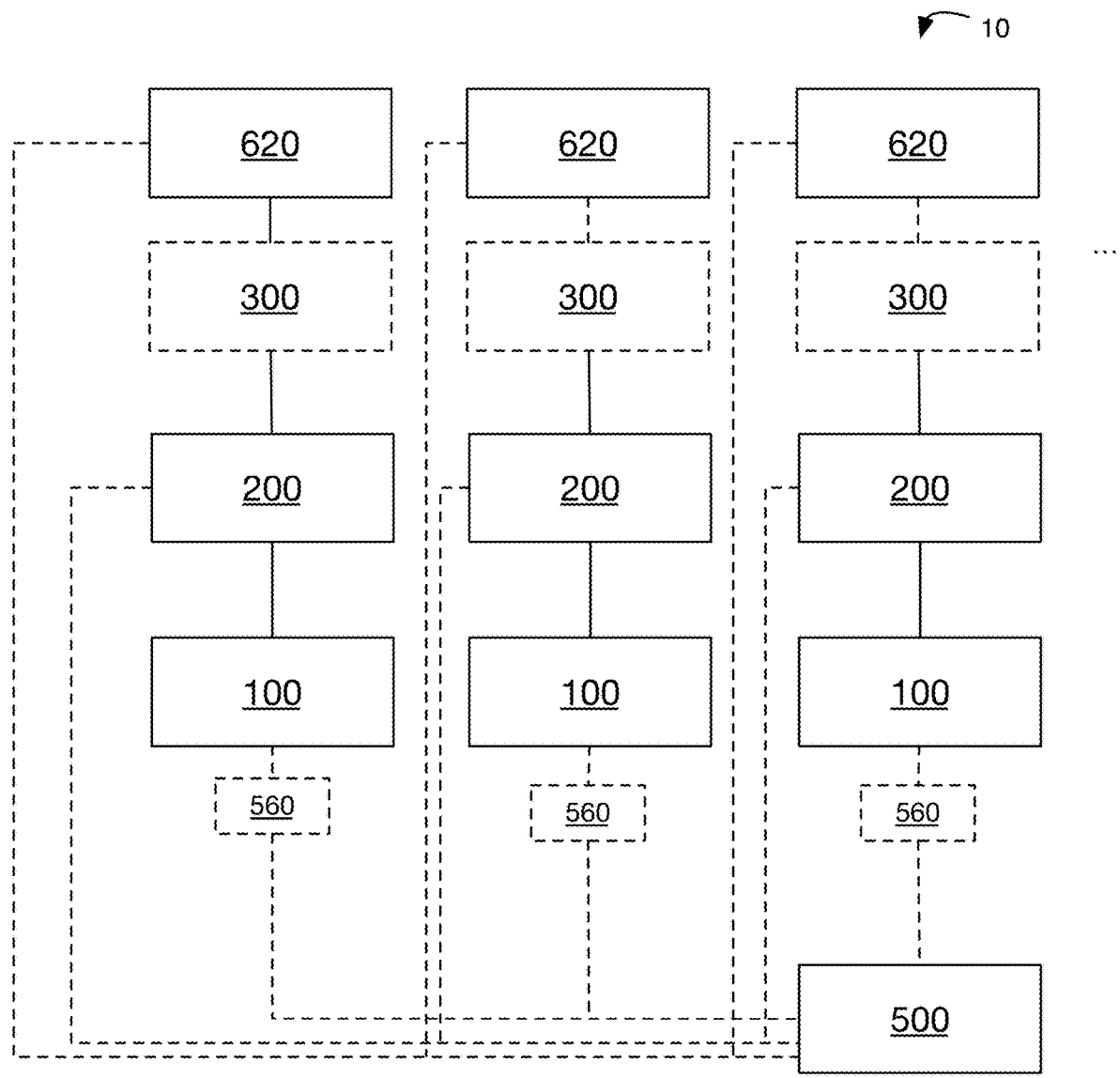
FIG. 11 is a schematic representation of an exemplary embodiment of the system.
Figure 12:
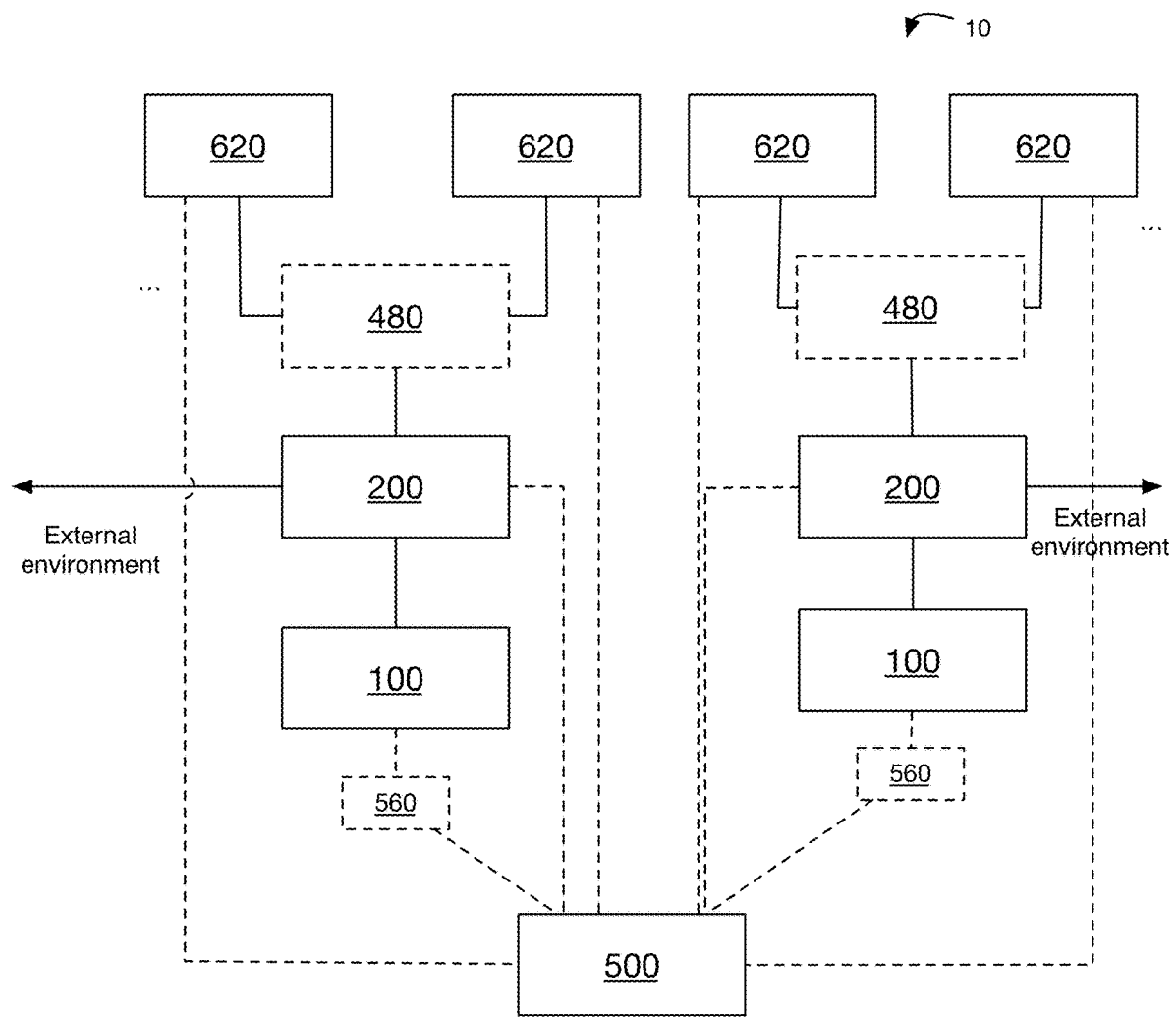
FIG. 12 is a schematic representation of an exemplary embodiment of the system.

Each reservoir can be in fluid communication with a single endpoint and/or a plurality of endpoints (e.g., with one or more manifolds). The end point can be an emission structure, an array of emission structures (e.g., an emitter array), a plurality of emitter arrays, and/or any suitable end points. In a first illustrative example, as shown in FIG. 11, a system (or thruster thereof) can include a plurality of emitter arrays 620 (each of which can include one or more emitter structures 625), where each emitter array can be associated with (e.g., fed working material from) a different reservoir. In a second illustrative example, as shown in FIG. 12, a system (or thruster thereof) can include a plurality of emitter arrays (each of which can include one or more emitter structures), where the emitter arrays can be separated into a first and second subset of emitter arrays (e.g., associated with a first and second voltage or voltage polarity) where each subset of emitter arrays is associated with (e.g., fed by) a reservoir. In a third illustrative example, as shown in FIG. 10, a system (or thruster thereof) can include a plurality of emitter arrays (each of which can include one or more emitter structures), where each emitter array can be associated with (e.g., fed working material from) a common reservoir. However, the emitter arrays and/or structures can otherwise be associated with any suitable reservoirs.

Figure 16A:
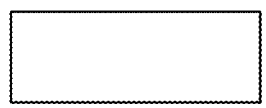
FIGS. 16A-16E are schematic representations of exemplary reservoir cross sections.
Figure 16B:
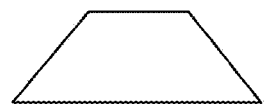
Figure 16C:
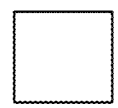
Figure 16D:
Figure 16E:
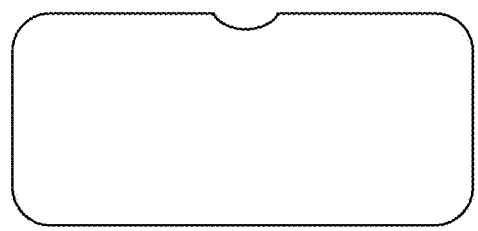

The reservoir (and/or subchambers thereof) preferably defines a volume for storage of working material (e.g., 100 nL, 1 μL, 10 μL, 100 μL, 1 mL, 10 mL, 100 mL, 1 L, 10 L, 50 μL-500 ml, etc.). The reservoir can be cylindrical (as shown for example in FIG. 16A or 16C), prismatoid (e.g., a polygonal prism, frustopyramidal, rounded prismatoid, as shown for example in FIG. 16B or 16C, etc.), spherical, hemi-spherical, hemi-cylindrical, conical, frustoconical (as shown for example in FIG. 16B), wedge, truncated wedge (as shown for example in FIG. 16B), lachrymiform (e.g., teardrop shaped, as shown for example in FIG. 16D), beveled (e.g., a beveled rectangular prism, as shown for example in FIG. 16E, etc.), and/or have one or more segments of any suitable shape. When a geometry of the reservoir tapers (and/or different faces of the reservoir have different areas), the reservoir outlet is preferably arranged on a reservoir face that has the smallest area (e.g., the tip of the taper, near where a tip of the taper would be positioned, the region with the most-acute and/or smallest angle between diverging surfaces, a smallest gap or distance between opposing surfaces, etc.) but can be on a face with the largest area, intermediate area, and/or any suitable face(s) of the reservoir.

The reservoir can be a single compartment, include subcompartments, include more than one compartment (e.g., pump compartment, working material compartment, manifolds connecting separate compartments, etc.), and/or can be otherwise suitably arranged. The reservoir (and/or compartments thereof) can be rigid, semi-rigid, and/or flexible. For example, the reservoir can be collapsed when not in use.

Figure 13:
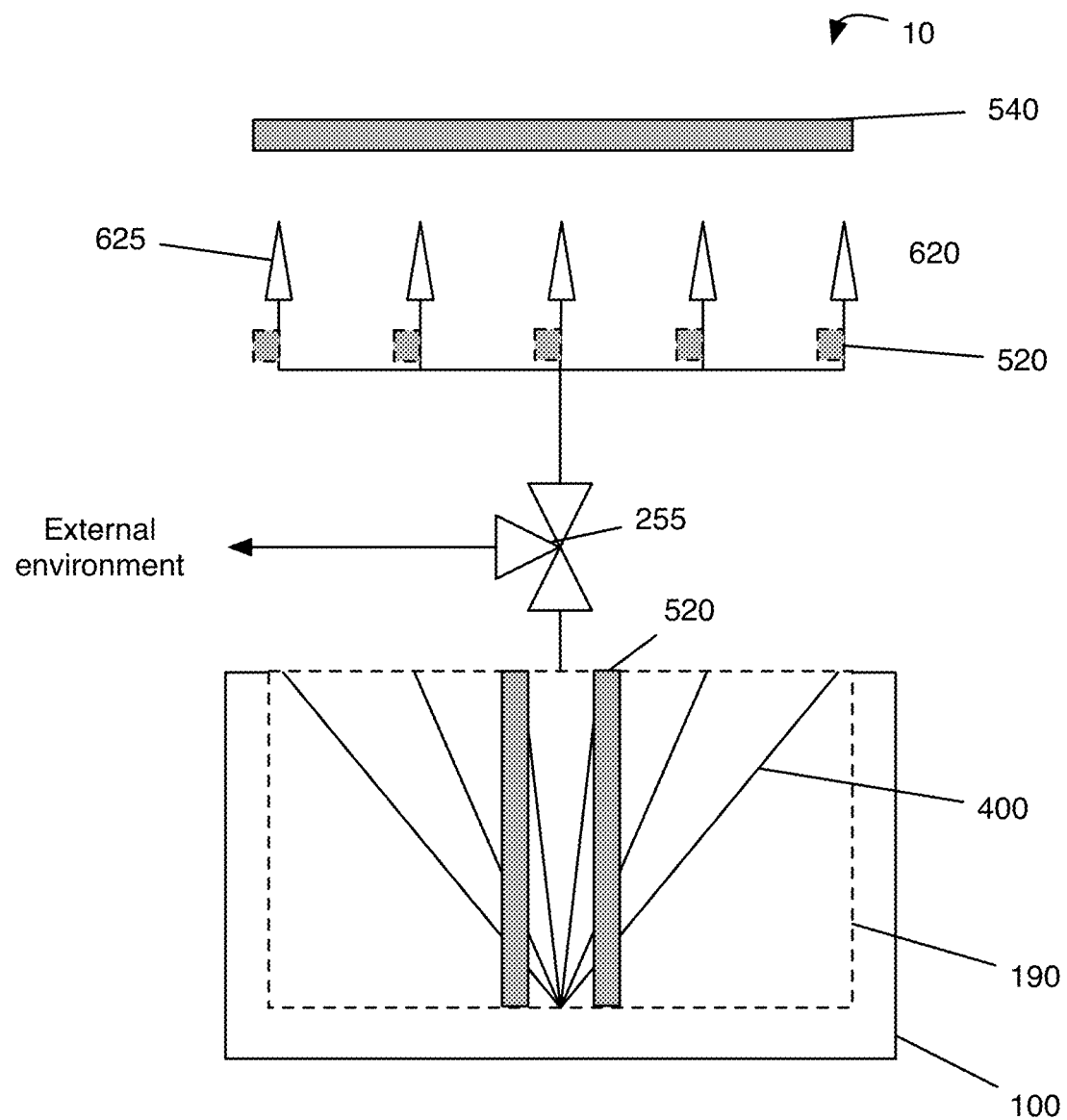
FIG. 13 is a schematic representation of an exemplary embodiment of the system.

In variants, the walls (and/or portions thereof) of the reservoir (and/or compartments or a subtank 190 thereof) can be permeable (e.g., allowing working material and/or contaminants to pass through such as porous, include through holes, etc.), solid, and/or have any suitable durometer. In a first specific example, all of the walls of the reservoir can be solid (e.g., nonpermeable). In a second specific example as shown in FIG. 13, the walls of the reservoir (or a subcompartment thereof) can be permeable (e.g., all of the walls, the walls excluding the wall connected to or including the flow management system, etc.).

The reservoir (e.g., reservoir walls, compartments, subcompartments, etc.) can be wetting and/or nonwetting (e.g., to working material). The reservoir is preferably made of dielectric material, but can be made of or include conductive material (e.g., metal, conductive glass, etc.) and/or any suitable material(s). For example, the reservoir can be made of polymer (e.g., PEEK, PTFE, PEI, FKM, FFKM, etc.), glass, ceramics, and/or any suitable materials.

The reservoir can optionally include a getter which can function to accumulate (e.g., remove, store, capture, collect) contaminants and/or other unwanted materials from the working material. In variants, the reservoir can include a predetermined mass or volume of getter, can be coated with the getter, can be in communication with the getter, can be made of the getter, and/or can otherwise be interfaced with the getter. In specific example, the getter can include a zeolite, a flashed getter (e.g., barium, alkali metals, alkaline earth metals, aluminium, phosphorous, etc.), non-evaporable getters (e.g., zirconium allows such as St 707, St 787, St 101, etc.). In some variations, the getter can additionally or alternatively function as a gas reservoir such as to provide pressure for a pressurized reservoir. For example, a getter can be heated to release (or generate) gas which can pressurize (or increase a pressure of) the reservoir.

The reservoir (and/or other components or manifolds of the apparatus) can optionally include a thermal element (e.g., a heater, resistive heating element, Peltier cooling, etc.) which can function to control (e.g., increase or decrease) a temperature of the working material and/or apparatus. Modifying the temperature can be beneficial for modifying a viscosity and/or flow property of the working material (e.g., to increase or decrease a flow rate, to induce or hinder bubble formation, to induce or hinder contaminant removal, etc.). In an illustrative example, the viscosity of EMIM-BF4 has a lox viscosity change between −15° C. and 50° C. The thermal element can be embedded in, surround, be adjacent to one or more wall, and/or otherwise be connected to the reservoir and/or other component(s).

Figure 2:
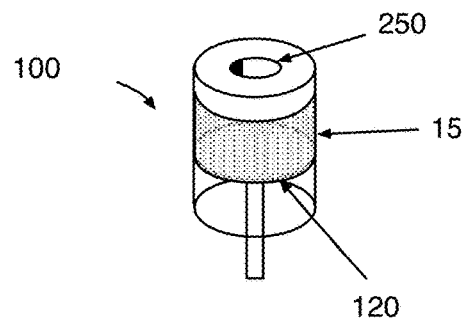
FIG. 2 is a schematic representation of an example reservoir.

The optional displacement module 120 (e.g., pump, as shown for example in FIG. 2, etc.) preferably functions to displace (e.g., expel) a controlled amount of working material from the reservoir (e.g., to dose the apparatus, dose an electrospray emission device, etc. with working material). In variants, the displacement module can optionally function to provide a negative pressure, such as to draw working material into the reservoir (e.g., to fill the reservoir), to modify a working material flow rate, to reverse working material motion (e.g., during operation), and/or for any purpose. The displacement module is preferably coupled to a control system. However, the reservoir can additionally or alternatively include a displacement module that is not coupled to a control system (e.g., a passive displacement module) and/or any other suitable displacement management system (e.g., that can establish a driving pressure or pressure gradient within the reservoir or apparatus such as a temperature control system that selectively heats or cools the working material, pressurized gas system that selectively pumps and/or vents a fill gas into the reservoir, a pressurized reservoir, etc.).

The flow axis of the working material out of the reservoir is preferably parallel to the displacement mechanism force direction; however, the flow axis can be parallel to a longitudinal axis of the reservoir, parallel to a central axis of the reservoir, perpendicular to the pump force, perpendicular to a longitudinal axis of the reservoir, perpendicular to a central axis of the reservoir, and/or arranged in any suitable manner.

The displacement module can be a positive displacement pump (e.g., a piston pump 125, a bellows pump, etc.), a spring 123 (e.g., connected to a baseplate, wherein the baseplate is in contact with the working material; conical spring; etc.), an actuator (e.g., a gas actuator, pneumatic actuator, etc.), bellows, a bladder 129 (e.g., pressurized gas bladder, fillable bladder, etc.), a diaphragm, a gas-over-fluid scheme, a gas-dissolved-in-fluid scheme, a screw rod, pressurized reservoirs 127, reservoirs with elastic walls (e.g., that bias one or more surfaces inward), a pressurization system (e.g., heating system, gas reservoir, etc.), and/or any other suitable component capable of displacing the working material. In a specific example, a dual spring configuration can be used (e.g., to provide more even pressure/force throughout the travel length); however, a single spring and/or any suitable number of springs can be used. In a specific example, the pump is a polyetherketone (PEEK) piston (e.g., pull piston, push piston). In a second specific example, the reservoir and/or a pumping or working material compartment can be made of a memory material (e.g., memory polymer, memory metal, etc.), where when the memory material is heated the memory material expands, shrinking the interior volume and thereby expelling working material. However, any suitable pump or displacement module can be used.

In a first specific example, the reservoir can include a working material subcompartment (e.g., a bag, a bladder, a membrane, etc.) configured to hold the working material. The working material subcompartment can function to provide a more complete seal (e.g., to contain the working material). In this specific example, working material can be expelled from the subcompartment when the displacement module strokes or actuates (e.g., generate pressure on the outside of the subcompartment). In a related example, the working material can be separated from the displacement module by a membrane (e.g., an internal wall within the reservoir that creates a working material subcompartment and a pumping compartment). In this specific example, the working material can be expelled (e.g., through the flow management system) in response to a pressure (e.g., pump actuation, gas introduction, equilibrium pressure gradient within the apparatus, etc.) in the pump compartment. However, the pump and working material can be in contact with one another, and/or the reservoir can be arranged in any suitable manner.

The displacement module preferably includes one or more sealants 140. The sealant can function to control the loss of working material and/or contaminants (e.g., via leakage, via evaporation, etc.), control the amount of force exerted by the displacement module (e.g., to ensure that the pump force does not exceed the pressure tolerance of the valve such as by failing at a lower pressure than the valve pressure tolerance), and/or otherwise function. The sealant is preferably a soft durometer material (e.g., polymers such as rubber); however, the sealant can be chemical (e.g., grease), a gasket, thread seal tape (e.g., Teflon™ tape), and/or any suitable sealant. In a specific example, the pump can include two Viton™ O-rings; however, any suitable gasket and/or sealant can be used. In some variants, a hollow O-ring can be used which can enable lower durometer materials (that can be more resilient to temperature ranges the apparatus is exposed to) to be used.

In embodiments of the reservoir that are pressurized (e.g., have a pressure differential relative to an external environment, relative to other components of the apparatus, etc.), the pressure (e.g., pressure difference relative to the external environment) of the reservoir can be approximately atmospheric pressure (e.g., 1 atm, 700-800 Torr, 09.-1.1 atm, etc.), less than atmospheric pressure (e.g., 1 Torr, 10 Torr, 100 Torr, 200 Torr, 500 Torr, 700 Torr, values therebetween, etc. which can have a lower risk such as to leaks or mechanical failure), greater than atmospheric pressure (e.g., 1000 Torr, 1500 Torr, 2000 Torr, 5000 Torr, 10000 Torr, values therebetween, etc.). The pressure can be static or variable. For example, as working material is expelled from the reservoir, the pressure can decrease. The pressure can arise from contaminants mixed (e.g., dissolved) within the working material, from a gas bladder, from gas within the reservoir, from gas formed within the reservoir (e.g., by inducing bubble formation by causing an electrochemical reaction in the working material within the reservoir by applying a current to the working material, introduced from a bubble or gas reservoir such as a secondary compartment, etc.), from a displacement module, and/or can otherwise arise.

In operation, the displacement module is preferably timed to operate synchronously with the flow management system (e.g., with a fixed time delay between the valve opening and the pump operation, at the same time, etc.); however, the displacement module and flow management system can operate asynchronously, the displacement module can continuously apply a pressure to the working material (e.g., expelling working material from the reservoir when the valve opens), and/or the displacement module can operate with any suitable timing.

The apparatus can optionally include one or more secondary reservoir(s) 180 which can function as sensing regions (e.g., to measure or detect one or more working material property), storage regions (e.g., local storage to enable rapid turn on), pressure reservoirs, gas reservoirs, decontaminated reservoir (e.g., to store decontaminated working material), contaminant reservoir (e.g., to store contaminants, to store contaminated working material, etc.), dose control regions (e.g., to reduce the required precision of dosing such as by providing a larger margin for error) and/or otherwise function.

3.2 Flow Management System

The flow management system 200 preferably functions to control the amount of and/or the timing with which working material leaves the reservoir and/or the apparatus (e.g., enters an emitter structure, enters a decontamination module, leaves a decontamination module, etc.). The flow management system can also function to prevent contaminants from entering the working material (e.g., by sealing the reservoir). The flow management system can include: one or more valves 250, a threaded pathway, an auger, and/or any other suitable component. The flow management system is preferably actively controlled but can additionally or alternatively be passively controlled (e.g., based on a cross-valve pressure differential). The flow management system is preferably in communication with the control system.

The flow management system can be arranged at the interface (e.g., a wall connecting, an edge connecting, a surface separating, etc.) between the reservoir and the decontamination module, within the flow path, within a manifold (e.g., tubing), at an interface with the output (e.g., proximal an inlet to the emitter structure) and/or can otherwise be situated. The flow management system (e.g., a broad face of the flow management system, an inlet to the flow management system, etc.) can be arranged parallel to a flow axis of the working material, perpendicular to the flow axis, and/or have any suitable orientation relative to the flow axis of the working material. However, the flow management system can be arranged in any suitable manner.

Figure 9A:
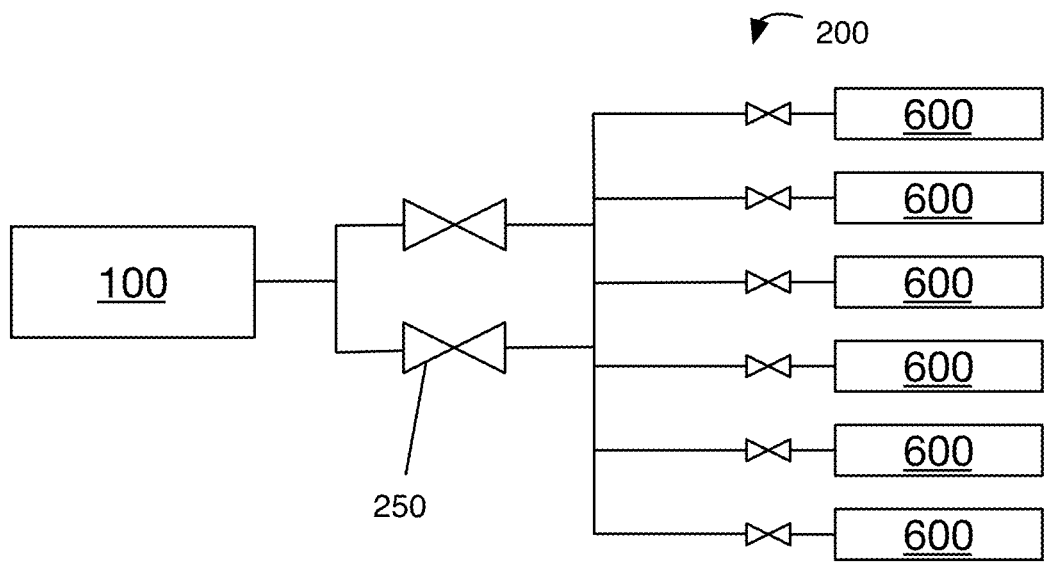
FIGS. 9A-9C are schematic representations of exemplary manifolds, including valves, between a reservoir and emitter.
Figure 9B:
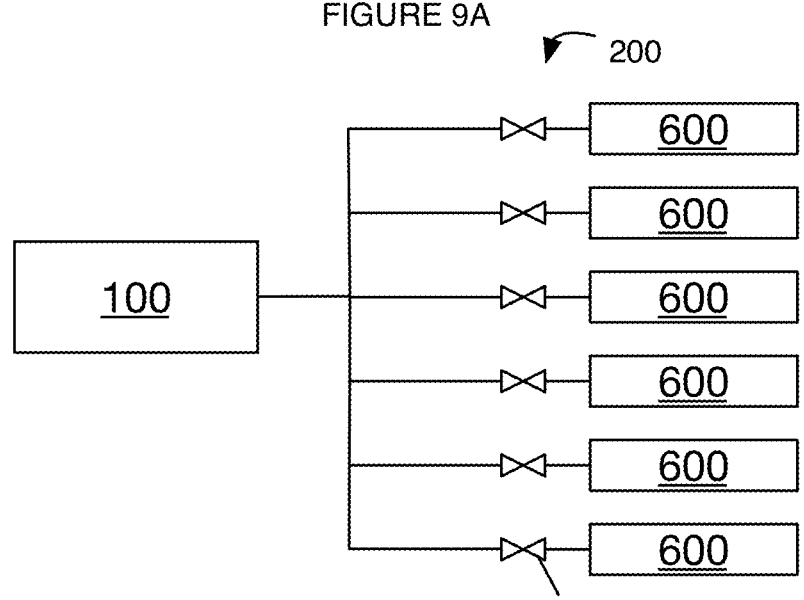
Figure 9C:
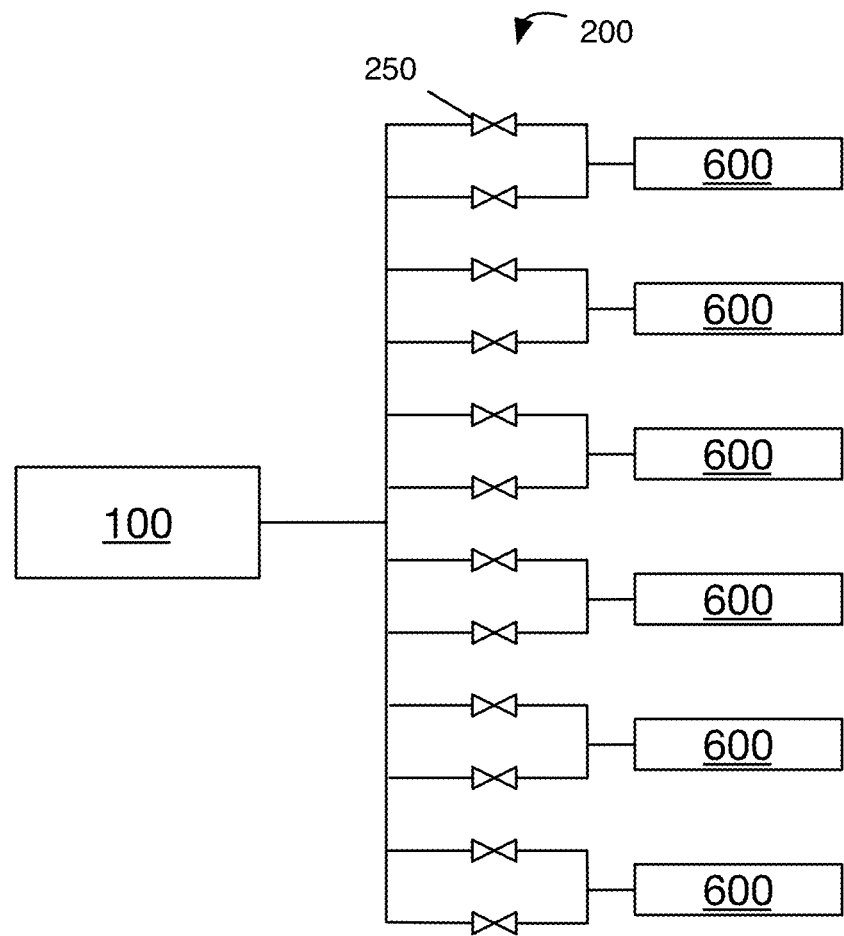

The apparatus can include one or more flow management systems. Each flow management system can be the same or different. The flow management systems can be in parallel (e.g., to provide redundancy for fluid control in the event a flow management system fails) and/or in series (e.g., to provide additional control points for fluid motion). For instance, a high reliability (e.g., lower probability of failure, higher operational range, larger, smaller, most robust, etc.) flow management system can be used as a primary valve (e.g., to interface a reservoir and a decontamination module and a lower reliability (e.g., relative to the primary valve) flow management system can be used to interface a manifold and an emitter. In a first illustrative example, as shown for example in FIG. 9A, the apparatus can include a first plurality of flow management systems in parallel (e.g., valves) at an outlet of the reservoir and a second plurality of flow management systems, in series with the first plurality of flow management systems, each associated with an emitter array or structure. In variations of this specific example, the first plurality of flow management systems can have a higher (e.g., because a failure of the first plurality can have a greater impact on the apparatus), lower (e.g., because there is no redundancy in the emitter flow management systems), and/or equal reliability relative to the second plurality of flow management systems. In a second illustrative example, as shown for example in FIG. 9B, the apparatus can include a plurality of flow management systems each associated with an emitter array or structure. In a third illustrative example, as shown for example in FIG. 9C, each emitter array or structure of the apparatus can be associated with a plurality of flow management systems in parallel, where each emitter array or structure is associated with a different plurality of flow management systems. In variations of the first, second, or third example, the flow management systems can interface any suitable components (e.g., decontamination module, reservoir, manifolds, emitters, propellant management devices, electrodes, etc.). However, the apparatus can include any suitable arrangement or combination of flow management systems with any suitable reliability.

The choice of flow management system (e.g., type, size, material, etc.) can depend on: a temperature (e.g., operation temperature, survivability temperature, working fluid temperature, etc.), a power draw, a response time, a size, a weight, a failure mechanism (e.g., whether a flow management system is more likely to fail in an open or closed state, a probability of a failure to occur, etc.), a wettability to working material, and/or any suitable properties of the flow management system. The flow management system is preferably made of a dielectric material (e.g., a polymer such as PEEK, PTFE, PEI, FKM, FFKM, etc.; a ceramic; a glass; etc.) but can be include or be made of a conductive material, semiconductor, and/or any suitable material.

The flow management system response behavior is preferably discrete (e.g., on/off); however, the flow management system can have continuous behavior (e.g., degree of opening can be any suitable value), semi-continuous behavior (e.g., multiple degrees of opening such as 10%, 20%, 30%, 40%, 50%, 60%, 70%, 80%, 90%, 100%, etc.), and/or have any suitable response behavior.

The flow management system can be include one or more: electrical valves (e.g., an electromagnetic valve such as a solenoid valve), motor-operated valves, piezoelectric valves, check valves, ball valves, thermally actuated valves, electrowetting valves, pneumatic valves, hydraulic valves, single use valves (e.g., a burst disc), stent valves (e.g., a valve with a stent providing tension to a wick, PMD, or other material to constrict flow while the stent is present), custom valves (e.g., a sliding gate valve actuated by a stepper motor), multistage valves (e.g., branching multi-stage valve), thermal phase change valves (e.g., where working material flow is enabled or disabled based on a change in the phase of the material such as by freezing a material to seal said valve, by rendering a valve wetting or nonwetting upon phase change, etc.), three position and/or three way valves 255 (e.g., as shown for example in FIG. 13; in an example, the valve can be operable between a closed position, single port open, and dual-port open position), magnetic fluid valves (e.g., a magnetic fluid that is able to reversibly or irreversibly block the flow of a working material), and/or any suitable valve.

The flow management system is preferably wetting (e.g., self-wetting), but can be non-wetting, to the working material. A self-wetting valve can be achieved, for example, by presoaking the valve with working material, using a solid working material (e.g., a room temperature ionic solid or high melting point ionic compound) where the solid working material can be depleted (e.g., by heating the material to induce a phase change), by leveraging electrowetting (e.g., has a surface potential, interaction energy, chemical potential, etc. such that the valve is wetting when energized and nonwetting when the valve is not energized or vice versa), and/or can otherwise be achieved.

Figure 8A:
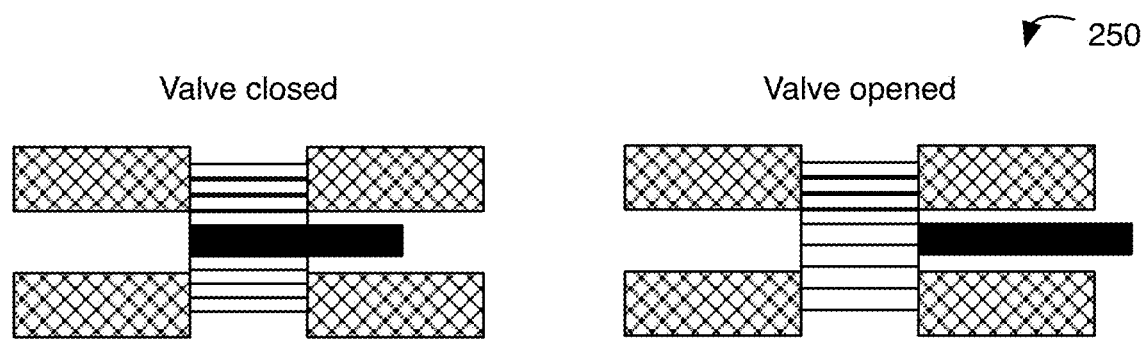
FIGS. 8A and 8B are schematic representations of exemplary valves.

In an embodiment, as shown for example in FIG. 8A, a flow management system can include a shutter (or other shut-off/separator), where the shutter can function to hinder or prevent working material from passing through the flow management system. The shutter can be used to compress a material (e.g., a porous compressed material such as glass fiber paper) where upon release of the shutter (e.g., removal from the flow path), the working material can flow because of expansion of the compressed material (e.g., because the porous pathways open; because the material expands to contact another wick, PMD, etc.; etc.).

Figure 8B:
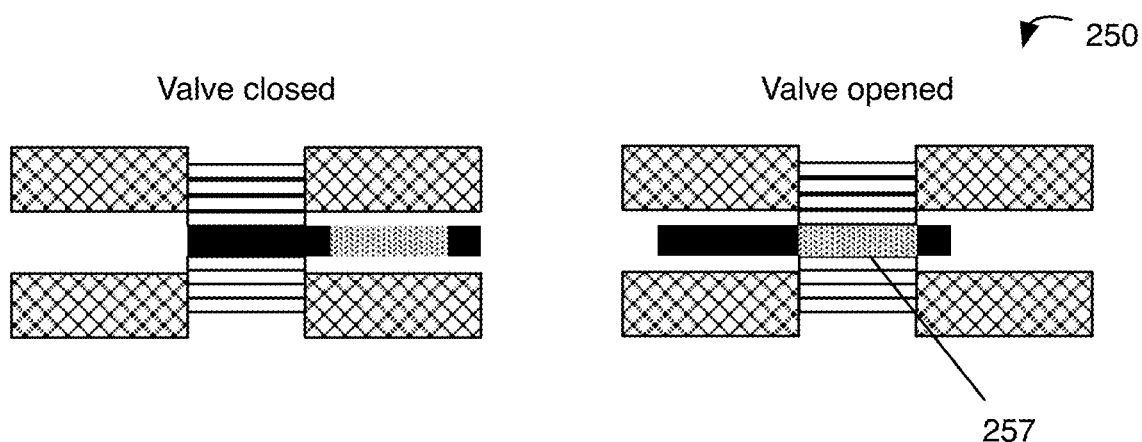

In a second embodiment (that may be combined with or separate from the first embodiment) as shown for example in FIG. 8B, a valve can include a hole filled with wicking material 257 (e.g., a material that is the substantially the same as and/or different from other potential wicks). In the closed state, this hole is not aligned with the inlet and outlet holes. In the open position, it is aligned, and the wicking materials contact to allow propellant to passively wick. However, the valve can otherwise be configured.

The amount of working material released from the reservoir is preferably determined by the duration that the flow management system remains open and properties of the flow pathway; however, the amount of working material can be controlled by the pump, extent of actuation (e.g., extent of opening) of the flow management system, wettability of the flow management system, and/or in any suitable manner. The duration of opening (e.g., valve duration) can be the amount of time that the valve is open to closed; however, the duration can be the amount of time between sending an open signal to open the valve and a close signal to close the valve, and/or any suitable amount of time.

Figure 5:
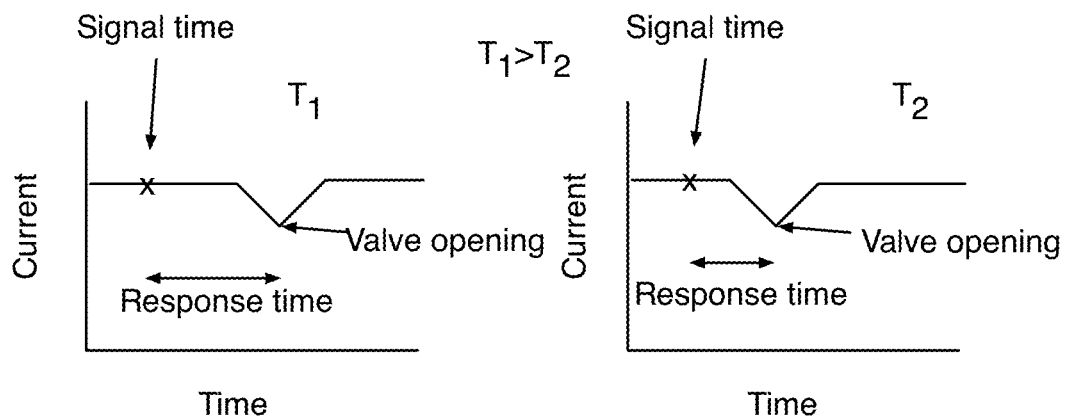
FIG. 5 is a schematic representation of examples of valve response time depending on valve temperature.

In specific variants, the response time (e.g., time between the valve receiving an instruction to open and the valve opening) can vary (e.g., between 0-200 ms and/or any suitable amount of time, randomly, deterministically, quasi-deterministically, etc.). In these variants, the time at which the valve opens can be determined based on detecting a change in an electrical parameter (e.g., to account for this variation in the response time, to determine the start of the valve open duration, etc.). In a specific example, as shown in FIG. 5, the response time for the valve can be determined based on detecting a change in the current applied to the valve. In this example, the valve can remain open for the duration based on the valve open time. In a second specific example, the valve response behavior can be semi-continuous (e.g., allowing partial opening, allow partial closing, etc.). In this specific example, the extent to which the valve is opened can determine the response time of the valve (e.g., valve response time is 20 ms for 10% opening vs 150 ms for 80% opening). In this specific example, the amount of working material released can be determined by both the extent of actuation of the valve and the duration of time that the valve is open. However, the valve operation timing can be determined in any suitable manner. Similar principles can apply to valve closure dynamics. Valve opening dynamics and valve closure dynamics can be the same, symmetric, asymmetric, depend on one another, different, independent, and/or can otherwise be related.

In specific variants, the valve functionality (e.g., response time, ability to open and/or close, etc.) can depend on the valve temperature. In a specific example, if the valve temperature is below a threshold temperature, the valve cannot be opened. In a second specific example, as the temperature of the of the valve increases, the response time (e.g., average response time, time to open, time to close, etc.) can decrease. However, the valve functionality can change with temperature in any suitable manner.

In some embodiments, the valve can be used to modify (e.g., increase, decrease) a temperature of a spacecraft (e.g., spacecraft on which the apparatus is loaded), apparatus, and/or one or more components of the apparatus (e.g., the flow management system such as a solenoid valve, the working material, etc.). This can be accomplished, for instance, by controlling the electrical power supplied to a valve (e.g., a solenoid valve by modifying the duty cycle, voltage, current, circuit resistance, etc.). In a specific example of this embodiment, if the minimum operation time for the valve (e.g., amount of time required to open and/or close the valve, minimum duration of electrical signal required to actuate the valve, etc.) is a predetermined time (e.g., 20 ms), then an oscillating electrical signal with period shorter than the predetermined time (such as 10 ms in this illustrative example) can be applied to heat the valve (e.g., without engaging or partially engaging valve operation). In a second specific example of this embodiment, a motor (e.g., stepper motor) can be powered (e.g., draw electricity or energy) without changing position. However, the temperature of the valve can be modified in any suitable manner.

In a second specific embodiment, the response time of the valve can be used to determine the temperature (e.g., of the valve, of the apparatus, of the working material, etc.). For example, the valve temperature can be: calculated, looked up, or otherwise determined based on the measured response time. This embodiment can function to determine the temperature without requiring additional temperature sensors (e.g., minimizing the total system weight, mechanical and electrical complexity). However, the valve function can be used in any suitable manner.

The valve is preferably operated with closed-loop control; however, the valve can be operated with open-loop control, feedforward control, and/or with any suitable control. In a specific example of closed loop control, closed loop can be based on an electrical parameter (e.g., electrical current, voltage, etc.) such as of an electrospray emission device, of a working material sensor, and/or any suitable electrical parameter. The electrical parameter can be related to the amount of working material (e.g., amount of working material available to the electrospray emission device). When the electrical parameter passes (e.g., exceeds, falls below, etc.) a threshold, the valve can be opened to dose working material. After dosing (e.g. a predetermined quantity, for a predetermined amount of time, etc.), the valve can be closed. However, the valve can be controlled in any suitable manner.

3.3 Decontamination Module

The decontamination module 300 (e.g., outgassing chamber, degassing chamber, decontamination chamber, decontamination region, etc.) preferably functions to remove contaminants (e.g., volatile contamination) from the working material (e.g., promote contaminant precipitation) before the working material is expelled (e.g., at an emitter). The decontamination module can function to control or modify the flow properties of the working material (e.g., stability, inhibit bubble formation near the outlet, promote bubble formation downstream from the outlet, minimize turbulence, etc.) and to expel the working material, such as to an emitter array or structure (e.g., of an electrospray emission device).

The decontamination module is preferably in fluid communication with the external environment (e.g., exposed to the space environment when a satellite is in orbit); however, the decontamination module can be in fluid communication with a contaminant compartment (e.g., configured to collect contaminants), and/or have any suitable configuration. The contaminants are preferably expelled (e.g., into the external environment) and the working material remains within the decontamination module (e.g., to fed downstream structures or components within the apparatus). However, in some variants, it can be preferable to (temporarily or permanently) retain the contaminants within the apparatus (e.g., to provide electrical isolation of working material; to pressurize the apparatus; to prevent, promote, and/or regulate phase change of the contaminants and/or working material; to prevent, promote, and/or regulate chemical reactions of the working material, contaminants, apparatus, etc.; etc.), the working material can be expelled from the decontamination module while contaminants are retained within the decontamination module, contaminants and working material can remain within the decontamination module (e.g., in different chambers), the contaminants and working material can be expelled from the decontamination module (e.g., via different ports), and/or contaminants and the working material can otherwise be disposed of by the decontamination module. The decontamination module can be permanently, temporarily, responsive to a trigger (e.g., a threshold concentration of contaminants, a planned need or request for working material, etc.), periodically, randomly, at a predetermined timing, and/or otherwise be in fluid communication with the external environment.

The decontamination module can be a chamber, a manifold or channel (e.g., a capillary, a microfluidic channel, a tortuous path, etc.), and/or have any suitable form. The decontamination module can be a separate component (e.g., a separate location within the apparatus) and/or be integrated with another component (e.g., a voltage isolator, a reservoir, a manifold, flow management system, etc.).

Working material preferably enters the decontamination module through one or more inlets, wherein the inlets can be located at one wall (e.g., end) of the decontamination module; however, the inlets can be arranged in a side wall of the decontamination module, in the center of the decontamination module, along the centerline (e.g., longitudinal axis) of the decontamination module, along the base of the decontamination module, and/or in any suitable manner. The inlet can be the same as or different from the flow management system. Working material is preferably expelled from the decontamination module through one or more outlets (e.g., at the PMD). The outlet is preferably arranged on a wall (e.g., end) opposing the inlet; however, the outlet can be arranged on a side wall (e.g., opposing the inlet, distal the inlet, etc.), the same wall as the inlet, can be the inlet (e.g., wherein the fluid flow management system can direct working material motion), can be part of the propellant management device, and/or arranged in any suitable manner. However, the working material can enter or exit the decontamination module through a wick, through a porous wall, through a membrane, and/or otherwise enter or exit the decontamination module. The decontamination module can be leaky, be substantially solid and/or sealed, or otherwise configured.

The decontamination module (e.g., side walls) is preferably made of porous material, but can additionally or alternatively include through holes, be solid (e.g., include a flow management system that fluidly couples the decontamination module to the external environment), and/or have any suitable morphology or structure. The decontamination module can be made of polymers (e.g., PEEK, FKM, FFKM, PTFE, etc.), ceramics (e.g., dielectric ceramics), glass, metal, alloys, and/or any suitable material(s).

The pore characteristics (e.g., pore size, pore density, pore distribution, etc.) of the decontamination module (e.g., walls thereof) can be chosen based on a burst pressure, wetting behavior (e.g., of the working material, of contaminants, etc.), degassing efficiency (e.g., amount of contaminants removed such as a percentage, mass, volume, etc. of contaminants; speed of contaminant removal; etc.), size of the decontamination module, and/or based on any suitable property. The pore size can be any suitable value or range thereof less than or equal to about 10 μm (e.g., 10 nm, 20 nm, 50 nm, 100 nm, 200 nm, 500 nm, 1 μm, 2 μm, 5 μm, 10 μm, values therebetween, etc.); however, any suitable pore size can be used.

In a specific example, the decontamination module is made of porous polytetrafluoroethylene (PTFE), polyether ether ketone (PEEK), fluoroelastomers (FKM), perfluoroelastomers (FFKM), polyetherimide (PEI), and/or any suitable material(s). In this example, the pores can be between approximately 1-10 μm in size and be randomly distributed. In this example, the walls of the decontamination module can be nonwetting (e.g., contact angle between working material and decontamination module is ≥90°, locally nonwetting such as at the length scale of the pores) or wetting (e.g., contact angle between working material and decontamination module is <90°) to working material. The decontamination module can additionally or alternatively be nonwetting due to surface roughness, contamination, surface energy, and/or the wetting behavior can be controlled in any suitable manner. However, the decontamination module can be made in any suitable manner.

In a second specific example, as shown for example in FIG. 13, the decontamination module can be integrated into the reservoir. In this specific example, the reservoir can be made of (or include an internal compartment or reservoir made of) porous material (e.g., porous PTFE, porous PEEK, porous PEI, porous FKM, etc.), where reservoir (or an air space proximal the reservoir where the porous material interfaces the reservoir and said air space) can be exposed to an external environment (e.g., based on a flow management system position, permanently, etc.).

Figure 15:
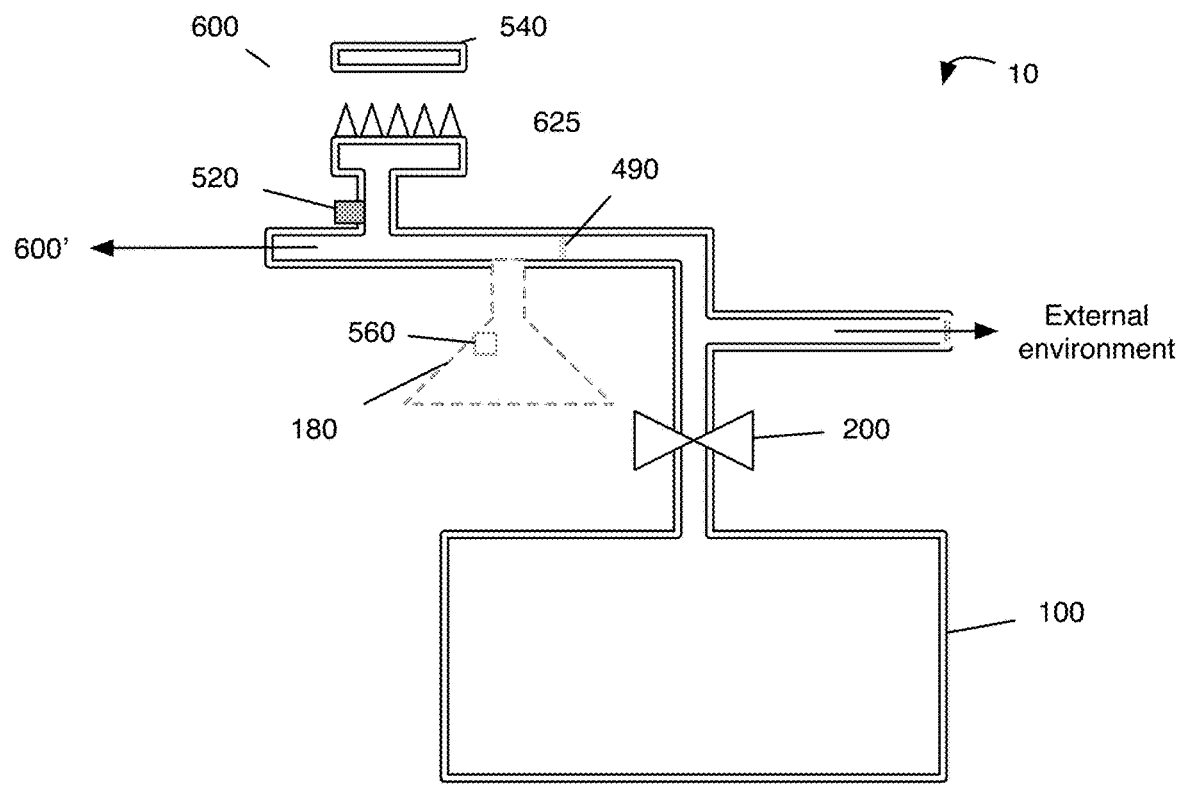
FIG. 15 is a schematic representation of an exemplary embodiment of the system.

In a third specific example, as shown for example in FIG. 15, a manifold can be in fluid communication with an external environment (e.g., via porous materials, via a flow management device, via an opening, etc. where the manifold can function as the decontamination module), an emitter array 625, and an additional endpoint 600'.

However, the decontamination module can otherwise be arranged.

3.4 Propellant Management Device

The optional propellant management device 400 (PMD) preferably functions to control the working material as it is expelled or passes through the apparatus (e.g., minimize gas bubble formation near the outlet of the PMD, ensure continuous working material flow, induce negative surface curvature in the working material, induce positive surface curvature in the working material, flat surface in the working material, stable working material flow, etc.). The PMD is preferably passive (e.g., structural such as based on surface roughness, geometry, microfluid channel, etc.); however, the PMD can be active (e.g., operate using electrowetting, based on a temperature, etc.). The PMD preferably operates based on capillary force to draw working material along the PMD; however, any suitable mechanism can be used.

The PMD can be integrated into a decontamination module (e.g., where working fluid enters the decontamination module and is preferentially drawn to the PMD rather than the decontamination module walls; as shown for example in FIGS. 3A-3F, 4A, 4B, 6A-6B, or 14; etc.), a reservoir (e.g., to ensure most or all working material is removed from the reservoir, to avoid or minimize working material left in the reservoir, as shown for example in FIG. 13, etc.), a manifold, a flow management system (e.g., a wicking structure that is separated and brought together by action of a valve or shutter), and/or otherwise be integrated within the apparatus or components thereof.

The working material preferably wets the PMD. The PMD wettability can be controlled by the PMD porosity, material, surface energy, structure, morphology, surface roughness, radius of curvature, and/or any other PMD property and/or combination of properties. The PMD material can be glass (e.g., glass fiber, borosilicate, etc.), paper, polymer (e.g., polyether ether ketone (PEEK), PET, PTFE, PEI, FKM, FFKM, etc.), metal, and/or any suitable material.

The PMD is preferably aligned axially within the volume in which it is contained (e.g. a longitudinal axis of the PMD parallel to a longitudinal axis of the decontamination module); however, the PMD can be helically arranged, diagonally, and/or arranged in any suitable manner. The PMD is preferably the same characteristic linear dimension (e.g., height, length, width, diagonal, circumferential, preferred alignment axis, etc.) as the volume in which it is contained or included; however, the PMD can be shorter than and/or larger than the characteristic linear dimension of the volume. The PMD is preferably centrally (e.g., concentrically arranged, proximal a center, with overlapping central axes, etc.) within the volume; however, the PMD can be off-center within the volume, and/or arranged in any suitable manner. The PMD can have rotational symmetry, reflection symmetry, inversion symmetry, rotoreflection symmetry, and/or be asymmetric.

The PMD can include structures 430 which can function to increase a wettability of the PMD to the working material, induce a predetermined curvature in the working material, and/or otherwise function. Exemplary structures include: vanes, rods, cones, fractal shapes, pyramids, wedges, and/or any suitable structures can be used. Structures that taper (e.g., have a cone-like structure) can taper towards a central axis of the PMD, away from a central axis of the PMD, can taper along a circumference of the PMD, can taper helically along a PMD, and/or can otherwise taper relative to the PMD (e.g., a central axis thereof).

The cross-section of the PMD (e.g., the cross-section perpendicular to the longitudinal axis) can sweep (e.g., be distributed around) any suitable angle (e.g., are length) between 0° and 360° such as 180° (sweeping a half-circle), 360° (sweeping a full circle), and/or any other suitable angle.

Figure 3A:
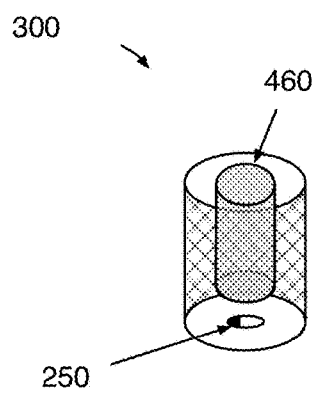
FIGS. 3A-3F are schematic representations of example decontamination modules from isometric (3A, 3C, and 3F) views and top-down views (3B, 3D, and 3F).
Figure 3B:
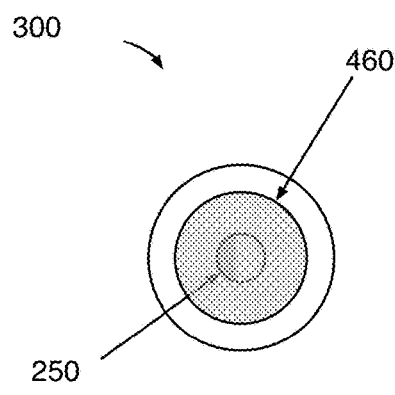
Figure 3C:
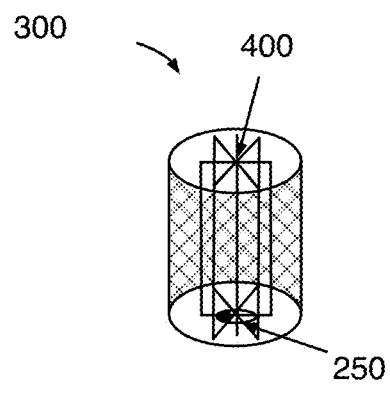
Figure 3D:
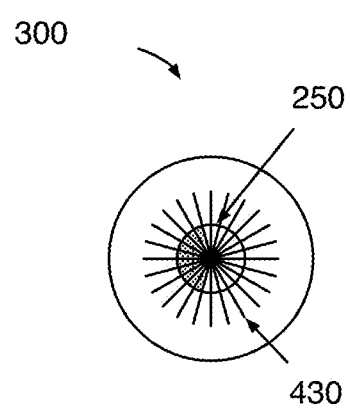
Figure 3E:
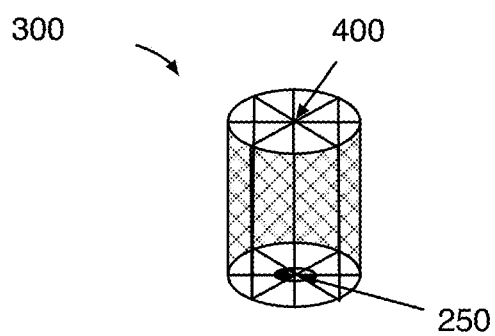
Figure 3F:
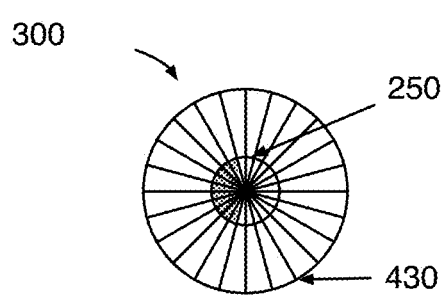
Figure 4A:
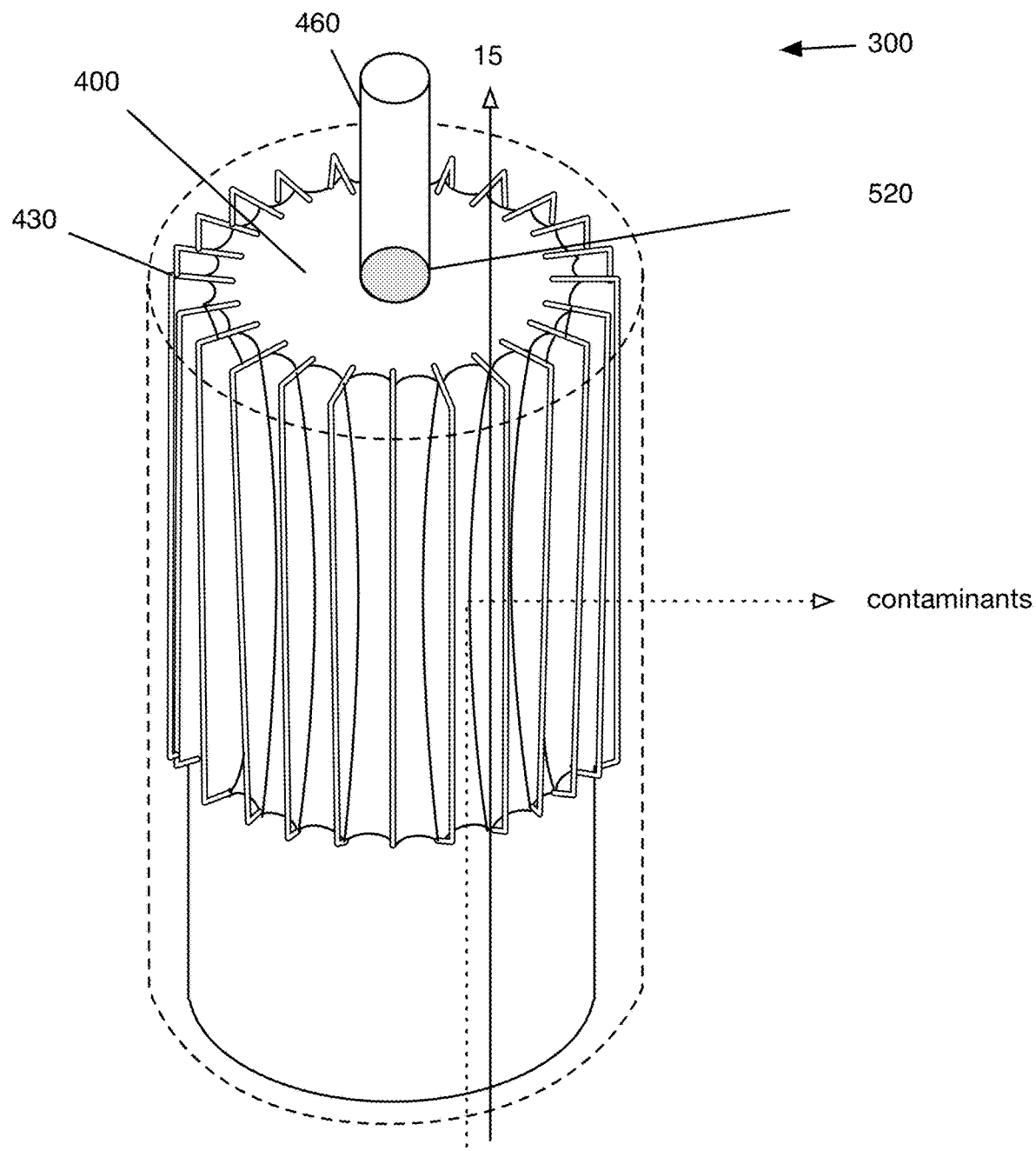
FIGS. 4A and 4B are schematic representations of exemplary decontamination modules.
Figure 4B:
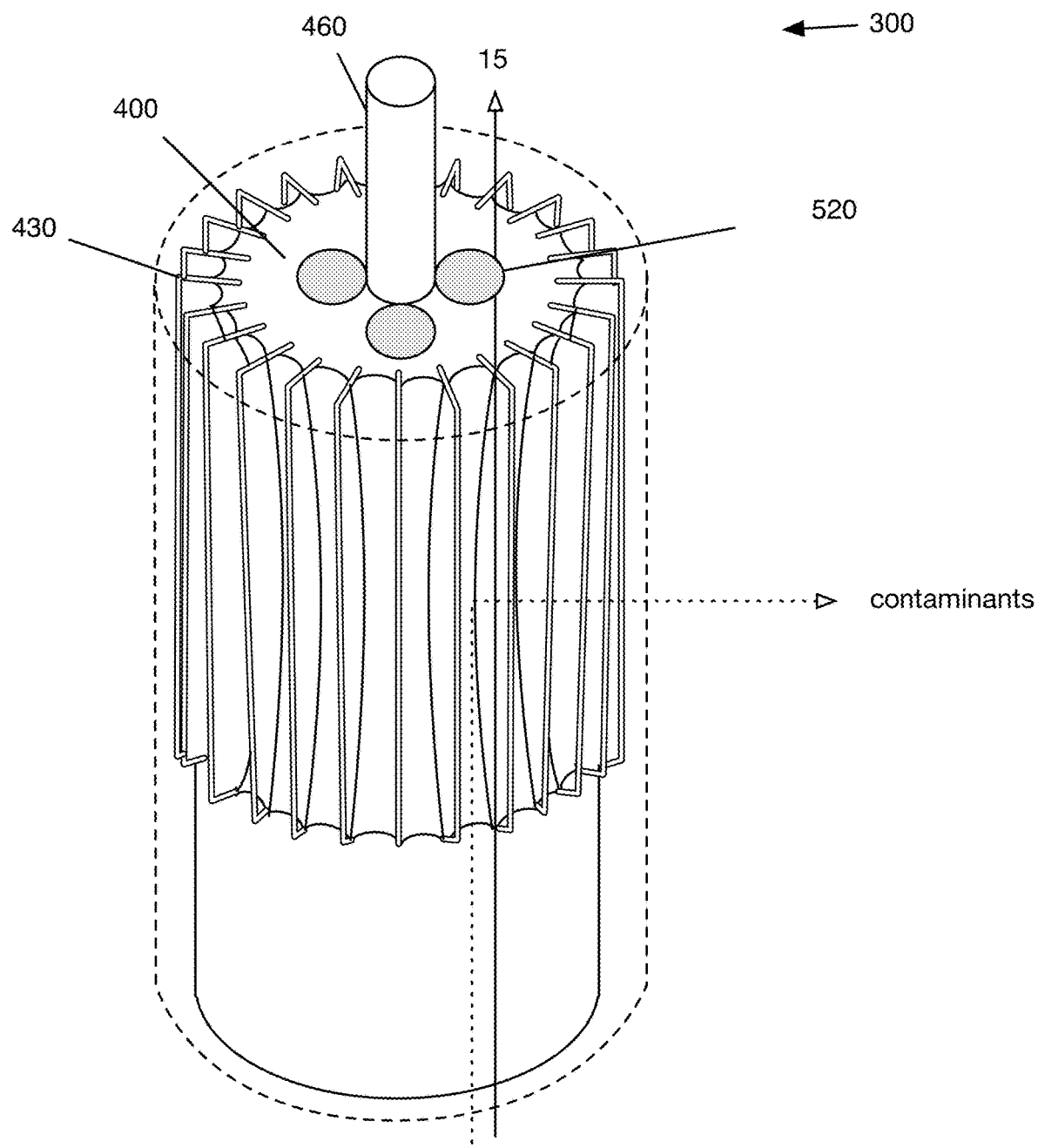

In one specific example, as shown in FIGS. 3A and 3B, a wick 460 (e.g., a porous wick) can be used in place of or in addition to the PMD. The wick can be substantially cylindrical; however, the wick can be polygonal prism, hemicylindrical, a ribbon, a rope, a cord, a bundle, and/or have any suitable shape. The wick can be flexible and/or rigid. The wick can be arranged concentrically within the decontamination module. The wick material can be glass fiber, plastic (e.g., PET, PE/PET, etc.), and/or any suitable material can be used. The wick pore size can be any suitable value and/or range thereof between 1 and 250 µm such as 1 µm, 10 µm, 100 µm, etc.; however, any suitable pore size can be used. The wick porosity can be any suitable percentage or range thereof between 20-80% such as 50%; however, any suitable wick porosity can be used. In variations of this example, a telescoping wick can be used. These variations can be particularly, but not solely, beneficial when the wick is proximal or integrated in a flow control mechanism (e.g., when flow is not desired, the wick can telescope whereas when flow is desired, the wick can be expanded), but can be used in any suitable situation.

In a second specific example, as shown in FIGS. 3C-3F and 4A and 4B, the PMD can include one or more vanes. The vanes (e.g., configuration, material, size, numerosity, etc.) can depend on the working material (e.g., material, temperature, contaminants, etc.). The vanes are preferably radially oriented; however, the vanes can have any suitable orientation. Each vane is preferably a straight-line segment (e.g., projecting out of a common center); however, one or more of the vanes can be serpentine, multiple line segments, and/or have any suitable morphology. The angle between the vanes can be chosen to result in a driving capillary pressure (e.g., based on a working material, PMD material, downstream components, upstream components, etc.), to ensure that the working material enters the PMD (e.g., as opposed to finding a stable equilibrium outside the PMD), to adjust (e.g., increase, decrease, make more negative, make more positive, etc.) a magnitude of the curvature of the working material (e.g., contact angle) as it wets the vanes; however, any suitable configuration can be used. For example, the angle between vanes can be less than or equal to 30°; however, any suitable angle can be used. In a specific example, the PMD includes 24 symmetric (e.g., rotationally symmetric, congruent, etc.) vanes; however, any suitable number of vanes (preferably between about 1-100, but can additionally or alternatively be >100) can be used. However, the PMD can be configured in any suitable manner.

In a third specific example, a microfluidic channel 480 (e.g., a channel with a small volume such as fL, pL, nL, µL, etc.; a channel with a size or characteristic dimension on the order of nm, µm, etc.; a channel with microdomain effects; etc.) can be used in place of (e.g., as a) and/or in addition to a PMD. A channel thickness of the microfluidic channel can depend on the working material (e.g., temperature, viscosity, material composition, contaminants, surface tension, etc.), a target flow rate, a target flow volume, and/or any suitable property. The channel can be straight, tortuous, boustrophedonic, serpentine, and/or follow any suitable path. However, particularly but not exclusively in microgravity environments, any suitable channel (e.g., macrochannel such as a channel with a large volume such as larger than µL; a channel with a size or characteristic dimension on the order of mm, cm, or larger; etc.) can be used.

3.5 Control System

The control system 500 preferably functions to provide control signals to active components of the apparatus (e.g., pump, valve, etc.). The control system can also transmit signals (e.g., measurements) to remote computing devices, determine apparatus operation parameters (e.g., from or based on sensor readings), and/or perform any suitable function. The control system is preferably in electrical communication with the displacement mechanism and the flow management system; however, the control system can be in wireless communication with the displacement mechanism and the flow management system, be in communication with any suitable component(s), and/or be arranged in any suitable manner. The control system is preferably local (e.g., a microprocessor); however, the control system can be remote, distributed, and/or otherwise suitably arranged.

The control system can optionally include one or more sensors 560. The sensor(s) can be arranged within the reservoir, a manifold, the flow path, the decontamination module, a PMD, a secondary chamber, a secondary reservoir, external the apparatus, and/or otherwise be arranged. The sensor(s) can monitor operation parameters of the apparatus (e.g., temperature, pressure, working material quantities, working material fluid properties, etc.). Alternatively, or additionally, the control system can determine the operation parameters based on the response of other apparatus components, operation parameters can be estimated based on models (e.g., fluid models) of the apparatus, and/or the operation parameters can be determined in any suitable manner. Exemplary sensors include: noncontact sensors (e.g., Hall effect sensors), conductive sensors (e.g., thermal conductivity, electrical conductivity, etc.), nonconductive sensors, temperature sensors (e.g., thermometers, thermocouples, etc.), flow sensors, optical sensors (e.g., index of refraction sensors, reflection, transmission, fluorescence, phosphorescence, electroluminescence, etc.), acoustic sensors, Pirani gauges, capacitive sensors, sliding flags, flexible membranes with conductive materials (e.g., where upon expansion or contraction the material can close a circuit), pressure gauges, pressure sensors, a relative potential sensor (e.g., to measure the relative potential between the working material and the electrode(s)) and/or any suitable sensors.

The apparatus can be coupled to, include, and/or otherwise be interfaced with one or more electrodes. For example, the apparatus can include an electrode 520 (e.g., a working electrode, distal electrode, ground electrode, emitter electrode, etc.) in electrical contact with the working material and a second electrode 540 (e.g., a field electrode, ground electrode, counter electrode, extractor electrode, etc.) that expelled working material can interact with and/or impinge upon. The electrodes can be driven at a voltage (e.g., a DC voltage, an AC voltage, a transient voltage, etc. such as using a power supply as disclosed in U.S. patent application Ser. No. 17/066,429 titled 'SYSTEM AND METHOD FOR POWER CONVERSION' filed 8 Oct. 2020 which is incorporated in its entirety by this reference), grounded (e.g., to the satellite, to the reservoir, etc.), floating, and/or have any suitable voltage.

The working material electrode 520 (e.g., the electrode in contact with the working material) can be connected to, part of, integrated with, and/or otherwise be related to a manifold, reservoir, PMD, decontamination module, and/or any suitable component of the apparatus. In a specific example, a working material electrode can be integrated into a wall of a manifold (e.g., the entire wall, coating a single wall, coating multiple walls, coating all walls, as shown for example in FIGS. 13-15, etc.). In a second specific example, as shown for example in FIG. 4A, a working material electrode (e.g., a porous electrode) can be arranged on a wick or other portion of a PMD that the working material passes through. In a third specific example, as shown for example in FIG. 4B, working material electrodes can be arranged around (e.g., touching; such as symmetrically around, fully surrounding, etc.) a wick or other portion of a PMD. In a fourth specific example, a working material electrode can be integrated within the reservoir. In a fifth specific example, two or more electrodes (e.g., configured to apply the same or different voltage, that are controlled by the same or different control systems, that are powered by the same or different power supplies, etc.) can be provided in the same working material flow path which can be beneficial to avoid large potential gradients or differences, to perform relative measurements (e.g., against one another), and/or can provide any suitable benefit. However, the working material electrode can otherwise be arranged.

The working material electrode(s) are preferably the only conductive material (e.g., electrically conductive) incidentally or intentionally in contact with the working material. However, other conductive material can intentionally or unintentionally contact working material. The distal electrode preferably has a large surface area (e.g., a specific surface area that is at least $100\ m^2\ cm^{-3}$, at least $100\ m^2\ g^{-1}$, etc.), but can have a low surface area (e.g., less than $100\ m^2\ cm^{-3}$, less than $100\ m^2\ g^{-1}$, etc.) and/or any suitable surface area.

Some embodiments of the apparatus, particularly, but not exclusively, when a single reservoir is used to provide working material to a plurality of emitter arrays or structures (e.g., emitters associated with working material at different voltages or different voltage polarity) can include a voltage isolator. The voltage isolator functions to isolate the voltage from working material fed to different endpoints (e.g., different emitters or emitter arrays). The voltage isolation can be provided, for example, by a vacuum (or low pressure) gap between successive liquid elements/packets, bubble formation within the working material separating pockets of working material (e.g., by forming bubbles within preferred regions of a decontamination module, driving degradation of working material, injecting material in any suitable phase into the working material flow, etc.), solidifying (e.g., in a nonconductive manner) working material within the working material flow, using a membrane or other device (e.g., a turbulator) that interrupts the working material fluid flow, using a valve (or other flow management device), an actuated disconnect of a wick (e.g., a wick bridge), and/or can otherwise occur.

In an illustrative example, a voltage isolator 490 can be a channel or manifold where the walls of the channel include a region that wets working material and a region that does not wet working material. When a back pressure is less than a threshold back pressure (e.g., flow halts due to non-wetting pinning capillary pressure at the non-wetting regions exceeds the feed pressure, a local liquid pressure has dropped below the vapor pressure leading to gas precipitation, etc.), working material will form droplets on opposing ends of the nonwetting region (e.g., a vacuum, air, gas, etc. gap across the nonwetting region), where the resulting gap can isolate the voltage on either side. For example, the channel can include regions that are wetting (e.g., about a circumference within the channel, for each wall defining a cross-section of the channel, etc.) and regions that are non-wetting (e.g., about a circumference of the channel, for each wall defining a cross-section of the channel, etc.) to the working material, where the working material generally forms gaps in the regions that are non-wetting. For instance, the wetting properties can be modified chemically (e.g., based on a material choice, by having segments of different materials, by chemical implantation, etc.), electrically (e.g., by controlling or inducing a target voltage or electric field at different regions along the channel), physically (e.g., using structures, based on a surface roughness, etc.), and/or otherwise be controlled. The non-wetting regions are preferably between about 100 μm and 10 mm in length (e.g., between 1 mm and 5 mm), but can be larger than 100 μm or smaller than 500 nm. The channel can include a single non-wetting region, a pattern of wetting and nonwetting regions, a plurality of non-wetting regions, and/or any suitable non-wetting regions. In variations of this illustrative example, contaminant removal (e.g., and resulting bubble formation) can be used to create the gaps (e.g., by having porous and nonporous regions of the channel, using valves or other control schemes for access to the external environment at particular locations, etc.).

In a second illustrative example, as shown for example in FIG. 17, voltage isolation can be achieved using a cavity (e.g., gap) between a channel 485 (e.g., microfluidic channel, capillary tube, porous channel, etc.) and a wick. In this example, the end of the channel proximal the wick can include a material 487 that is nonwetting to the working material (e.g., hydrophobic material, hydrophilic material, fluorophilic material, fluorophobic material, oleophilic material, oleophobic material, etc.), which can generate a capillary pressure (e.g., that hinders or prevents working material from entering the cavity). When a backing pressure exceeds the capillary pressure, working material can form a droplet (e.g., separated from the working material in the channel) and/or be ejected into the cavity, where it can impact the wick and be transported thereupon to downstream components (e.g., an endpoint).

However, voltage isolation can otherwise be achieved.

The apparatus can optionally include a trapping device (e.g., a filter, a getter, zeolite, etc.). The trapping device can function to remove contaminants (e.g., solid and/or liquid such as low vapor pressure liquid contaminants) from the working material. However, the trapping device can be the same as any suitable (porous) components of the apparatus, the trapping device can be integrated into the reservoir, flow management system, decontamination module, and/or the trapping device can be otherwise suitably arranged.

The apparatus is typically coupled to (e.g., feeds emitter material into) an endpoint 600 such as one or more emitter arrays 620 or structures. The emitters preferably emit substantially decontaminated working material (e.g., working material that includes at most about 1 ppt, 10 ppt, 100 ppt, 1 ppb, 10 ppb, 100 ppb, 1 ppm, 10 ppm, 100 ppm, 0.1%, 1%, values therebetween, <1 ppt, >1%, etc.) but can emit partially decontaminated working material (e.g., working material with less contaminants than as stored, as provided, as produced, etc.; working material that does not include or includes less than a threshold amount of specific contaminants such as less than a threshold amount of gaseous or volatile contaminants, less than a threshold amount of neutral contaminants, etc.; etc.), contaminated working material, and/or any suitable working material. Exemplary emitters (e.g., emitter arrays or emitter sites or structures thereof) can be porous emitters (e.g., as disclosed in U.S. patent application Ser. No. 16/879,540 titled 'APPARATUS FOR ELECTROSPRAY EMISSION' filed on 20 May 2020 or U.S. patent application Ser. No. 16/511,067 titled 'METHOD AND APPARATUS FOR A POROUS ELECTROSPRAY EMITTER' filed on 15 Jul. 2019, each of which is incorporated in its entirety by this reference), capillary emitters (e.g., as disclosed in U.S. patent application Ser. No. 17/216,425 titled 'APPARATUS FOR ELECTROSPRAY EMISSION' filed on 29 Mar. 2021, which is incorporated in its entirety by this reference), and/or any suitable emitter(s).

3.6 Specific Examples

Figure 6A:
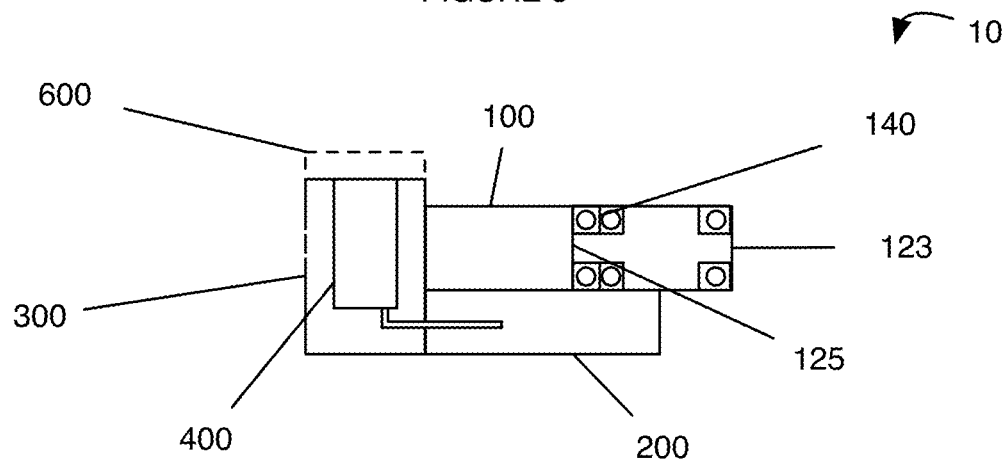
FIGS. 6a and 6b are schematic representations of cross-sections of examples of the apparatus in connection with an endpoint.
Figure 14:
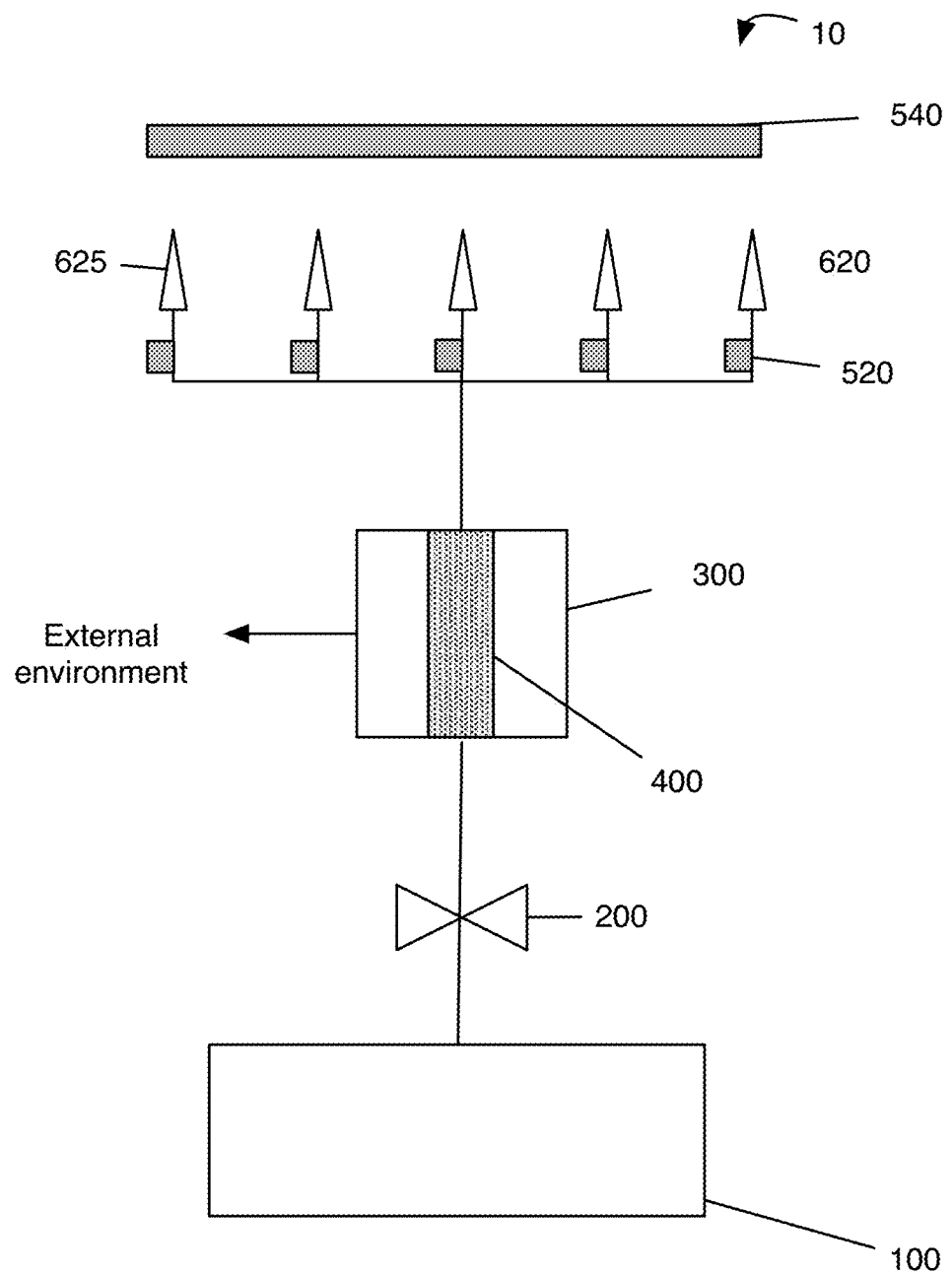
FIG. 14 is a schematic representation of an exemplary embodiment of the system.

In a specific example, as shown in FIGS. 6A and 14, the reservoir can be substantially cylindrical or prismatic. The reservoir can have an 8.5 mm diameter and a height≥8 mm (e.g., configured to hold at least 450 µL). The reservoir can include a piston arranged to provide a positive displacement of the working material into an outgassing chamber. The reservoir can be separated from the outgassing chamber by a valve such as a ¼" diameter solenoid valve. The valve can be opened to allow working material to enter the outgassing chamber. The outgassing chamber walls can be porous (e.g., porous PTFE) to allow contaminants to be removed (e.g., evaporate into the near-vacuum of the space environment). The outgassing chamber can include a propellant management device. The PMD can include 24 vanes made of PEEK. The vanes can be arranged concentrically within the outgassing chamber and can define a substantially star-shape. The working material can be expelled from the apparatus (e.g., into an electrospray emission device) along the longitudinal axis of the outgassing chamber. However, the apparatus can be otherwise suitably arranged.

Figure 6B:
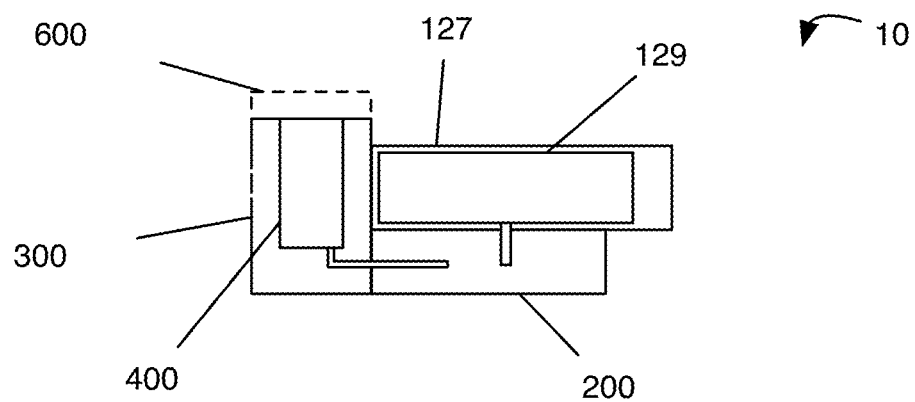

In a second specific example, as shown in FIG. 6B, the reservoir can be pressurized (e.g., to create a positive displacement pressure). The reservoir can include a membrane (e.g., bladder), where the bladder is configured to hold the working material. In response to opening of the flow management system, the pressure in the reservoir can cause working material to be expelled from the membrane. However, the apparatus can be otherwise suitably arranged.

In a third specific example, the reservoir can have a frustrum, cylindrical, prismatic (e.g., rectangular prism), or other shape. The reservoir can include a PMD (e.g., a solid or porous structure with vanes configured to wet with working material, a wick, etc.). In this specific example, apparatus can include a valve that is configured to (e.g., operable to) seal the reservoir (e.g., prevent working material from leaving the reservoir), expose working material within the reservoir to the external environment (e.g., to decontaminate the working material), and allow the working material to enter the apparatus (e.g., to be transported to the endpoint, wick and/or wet with working material). The valve can be opened to the external environment (e.g., in a first open state) for a predetermined amount of time, any time the valve is in a second open state (e.g., connecting the reservoir to the rest of the apparatus), periodically, at predetermined times (e.g., according to a schedule), based on a sensor reading (e.g., a contaminant level, a pressure reading such as until the pressure is at or below a threshold pressure, etc.), and/or at any suitable times or in response to any suitable signal. Variations of this example can include two or more valves, for instance, one flow management system (e.g., valve) that exposes or connects the reservoir volume to the external environment and a flow management system (e.g., valve) that connects the reservoir to the rest of the manifold (e.g., to an emitter).

In a fourth specific example, a reservoir can have a frustrum, conical, prismatic, cylindrical, and/or any suitable volume. In this specific example, the reservoir can be fluidly coupled to a channel with a valve (or other flow management system) between the channel and the reservoir. One or more walls of the channel can be made of or include porous material such that working material within the channel can be exposed to the external environment proximal the apparatus. However, the channel can include auxiliary channels that are coupled to the external environment and/or otherwise be coupled to the external environment. In some variations, the channel can include an electrode configured to apply (e.g., hold) the working material at a predetermined voltage for instance on a wall opposing a porous wall of the channel. The channel can include and/or function to isolate (e.g., electrically isolate, physically isolate such as to form droplets, etc.) working material within the channel. For example, the channel can include regions that are wetting (e.g., about a circumference within the channel, for each wall defining a cross-section of the channel, etc.) and regions that are non-wetting (e.g., about a circumference of the channel, for each wall defining a cross-section of the channel, etc.) to the working material, where the working material generally forms gaps in the regions that are non-wetting. For instance, the wetting properties can be modified chemically (e.g., based on a material choice, by having segments of different materials, by chemical implantation, etc.), electrically (e.g., by controlling or inducing a target voltage or electric field at different regions along the channel), physically (e.g., using structures, based on a surface roughness, etc.), and/or otherwise be controlled. The non-wetting regions are preferably between about 500 nm and 100 µm in length, but can be larger than 100 µm or smaller than 500 nm. The channel can include a single non-wetting region, a pattern of wetting and nonwetting regions, a plurality of non-wetting regions, and/or any suitable non-wetting regions.

However, any suitable apparatus can be used.

Figure 7:
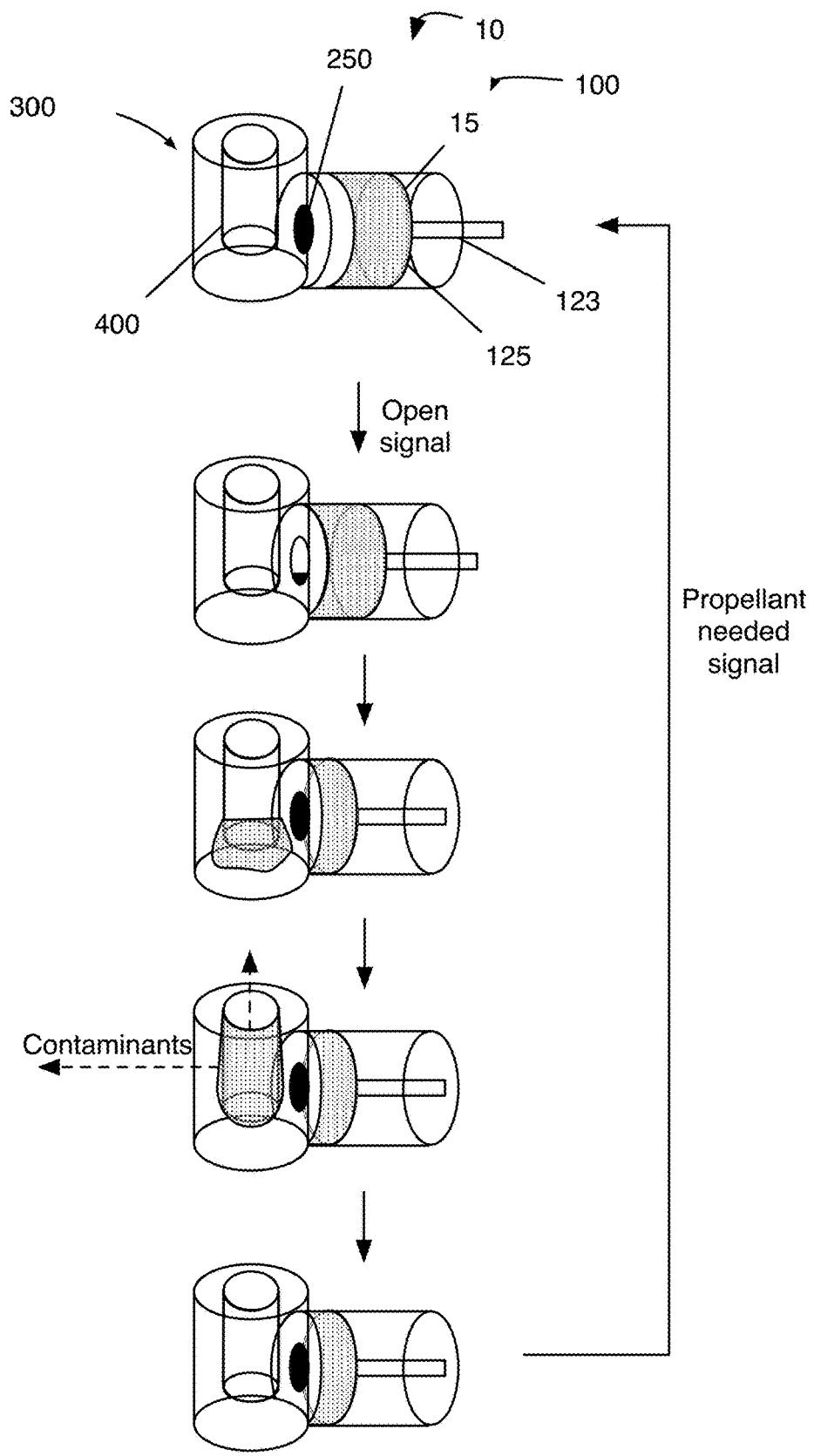
FIG. 7 is a schematic representation of an example of the use of the apparatus.

In a specific example of the use of the apparatus, as shown in FIG. 7, when the apparatus is not being used for maneuvers (e.g., during transportation, launch, storage, manufacture, etc.), the valve(s) can be disabled (e.g., closed); with working material enclosed within the reservoir (e.g., during manufacture, installation, etc. such as to prevent contamination of and contain the working material). When the apparatus is being used for maneuvers (e.g., reorientation, steering, propulsion, generating thrust, etc.), the control system can send an open signal to the valve. The valve can be actuated for a duration that depends on the amount of working material to be expelled (e.g., an amount of working material that enables thrust to be generated without flooding the apparatus and/or emitter chip). The pump can be actuated to expel working material from the reservoir. The pump actuation is preferably synchronous with the valve actuation; however, the pump actuation can be asynchronous. The working material can be degassed (e.g., in an outgassing chamber) to remove one or more contaminants. The working material is expelled (e.g., via a PMD into an emitter chip). As working material is expelled, these steps can be repeated to dose the outgassing chamber with more working material (e.g., in response to a working material needed signal, for example, generated by a change in electrical parameter such as current, voltage, etc. of the endpoint, or sensors, etc.; external signal(s); etc.) as needed. However, the apparatus can be used in any suitable manner.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. An electrospray system comprising:
 a first reservoir configured to store a working material;
 a first emitter and a second emitter each associated with a respective electrode, wherein the respective electrode associated with the first emitter is configured to apply a first electric polarity and the respective electrode associated with the second emitter is configured to simultaneously apply a second electric polarity, different from the first electric polarity, to the working material emitted from the first emitter and the second emitter, respectively;
 a manifold fluidly coupling the reservoir to at least one of the first emitter and the second emitter, wherein the manifold is in fluid communication with an external environment proximal the manifold; and
 a valve separating the reservoir from the manifold, wherein the valve is operable between:
 a closed state wherein the working material is sealed within the reservoir;
 a first open state wherein the working material within the reservoir is exposed to the external environment and is unable to enter the manifold; and
 a second open state wherein the working material within the reservoir is exposed to the external environment and is able to enter the manifold.

2. The electrospray system of claim 1, wherein the valve is operable to heat the working material.

3. The electrospray system of claim 1, wherein the working material comprises a low vapor pressure liquid.

4. The electrospray system of claim 1, further comprising a second reservoir configured to store the working material, wherein the manifold fluidly couples the first reservoir to the first emitter and wherein the second manifold fluidly couples the second reservoir to the second emitter.

5. The electrospray system of claim 1, wherein a volume of the reservoir is between 50 microliters and 500 milliliters of working material.

6. The electrospray system of claim 1, further comprising a another valve separating the first reservoir from the manifold, wherein the valve and the another valve are arranged in parallel relative to a working material flow path from the first reservoir to the manifold.

7. The electrospray system of claim 1, wherein at least one of the first reservoir or the manifold comprises a porous wall.

8. The electrospray system of claim 1, wherein the working material passively flows from the first reservoir to an outlet of the electrospray system.

9. The electrospray system of claim 8, wherein the first reservoir is a frustrum, wherein the first reservoir expands from an end of the first reservoir proximal the valve to an end of the first reservoir opposing the valve.

10. The electrospray system of claim 1, wherein the manifold further comprises an electrode, the electrospray system further comprising a voltage isolation module configured to electrically isolate the working material emitted from the first emitter from the working material emitted from the second emitter.

11. A system comprising:
 a reservoir configured to store ionic liquid;
 a decontamination module configured to remove contaminants from the ionic liquid;
 a valve between the reservoir and the decontamination module; and
 a manifold fluidly connecting the reservoir to an endpoint through the decontamination module, wherein the valve is operable between:
 a closed state wherein the ionic liquid is sealed within the reservoir;
 a first open state wherein the ionic liquid within the reservoir is exposed to an external environment and is unable to enter the manifold; and
 a second open state wherein the ionic liquid within the reservoir is exposed to the external environment and is able to enter the manifold.

12. The system of claim 11, wherein the endpoint comprises an emission structure.

13. The system of claim 11, wherein ionic liquid within the decontamination module is in fluid communication with the external environment.

14. The system of claim 13, wherein the contaminants are removed from the ionic liquid by evaporation into the external environment.

15. The system of claim 11, further comprising a propellant management device that comprises:
 a porous wick;
 a set of vanes, wherein a maximum angle between adjacent vanes of the set of vanes is 30°.

16. The system of claim 15, wherein the propellant management device further comprises an electrode.

17. The system of claim 15, wherein the propellant management system is integrated into the reservoir.

18. The system of claim 11, wherein the reservoir is configured to be pressurized to approximately 1 atm of pressure during satellite launch.

19. The system of claim 11, wherein the ionic liquid comprises at least one of: 1-ethyl-3-methyl-imidazolium tetrafluoroborate or hydroxylammonium nitrate.

20. The system of claim 11, wherein at least 0.1% contaminants by volume are dissolved in the ionic liquid.

21. The system of claim 12, wherein the emission structure comprises a first emitter and a second emitter each associated with a respective electrode, wherein the respective electrode associated with the first emitter is configured to apply a first electric polarity and the respective electrode associated with the second emitter is configured to simultaneously apply a second electric polarity, different from the first electric polarity, to the ionic liquid emitted from the first emitter and the second emitter, respectively.

\* \* \* \* \*